(12) United States Patent
Nguyen et al.

(10) Patent No.: US 10,753,736 B2
(45) Date of Patent: Aug. 25, 2020

(54) THREE-DIMENSIONAL COMPUTER VISION BASED ON PROJECTED PATTERN OF LASER DOTS AND GEOMETRIC PATTERN MATCHING

(71) Applicant: Cisco Technology, Inc., San Jose, CA (US)

(72) Inventors: Khanh Vinh Nguyen, Milpitas, CA (US); Douglas Roger Banks, Pleasanton, CA (US); Naveen Kumar Tyagi, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 11 days.

(21) Appl. No.: 16/045,898

(22) Filed: Jul. 26, 2018

(65) Prior Publication Data

US 2020/0033118 A1    Jan. 30, 2020

(51) Int. Cl.
*G01B 11/25*    (2006.01)
*G06T 7/521*    (2017.01)
(Continued)

(52) U.S. Cl.
CPC ...... *G01B 11/2518* (2013.01); *G01B 11/2545* (2013.01); *G06T 7/521* (2017.01); *G06T 7/593* (2017.01); *G06T 17/00* (2013.01)

(58) Field of Classification Search
CPC . G01B 11/2518; G01B 11/2545; G06T 7/521; G06T 7/593; G06T 17/00
See application file for complete search history.

(56) References Cited

U.S. PATENT DOCUMENTS 5,945,996 A * 8/1999 Migdal .................. G06T 17/20
  345/420
6,018,497 A * 1/2000 Gunasekera ............. G01V 1/28
  367/38
(Continued)

FOREIGN PATENT DOCUMENTS

CN    106228593 A    12/2016

OTHER PUBLICATIONS

Gross, Ed., et al., "Towards Autonomous Robotic Systems: 12th Annual Conference", [online], TAROS 2011, Aug. 31-Sep. 2, 2011, [retrieved on Jun. 26, 2018]. Retrieved from the Internet: URL: <https://books.google.com/books?id=2VgOBwAAQBAJ&pg=PA275&lpg=PA275&dq=delaunay+triangulation+dots+autonomous+vehicle&source=bl&ots=NSxHbo46v8&sig=hX6_tObtimUfpribJtL4_hLfPqs&hl=en&sa=X&ved=0ahUKEwin5pnlooPZAhUl5WMKHby1DAlQ6AEIXTAJ#v=onepage&q=delaunay%20triangulation%20dots%20autonomous%20vehicle&f=false>, 1 page.
(Continued)

*Primary Examiner* — Mohamed K Amara
(74) *Attorney, Agent, or Firm* — Leon R. Turkevich

(57) ABSTRACT

In one embodiment, a method comprises generating, by a computing device from first and second images of a projected pattern of laser dots detected by respective camera devices in a physical environment, a stereoscopic two-dimensional (2D) object pair based on determining 2D positions for each of the laser dots detected in the first and second images, creating a first mesh of geometric patterns from the 2D positions in the first image and a corresponding second mesh of the geometric patterns from the 2D positions in the second image, and creating the stereoscopic 2D object pair based on matching corresponding geometric patterns from the first and second meshes of the geometric patterns. A three-dimensional model (3D) of the physical environ-
(Continued)

ment is generated based on executing stereoscopic triangulation of the stereoscopic 2D object pair. The 3D model causes a controllable device to interact with the physical environment.

20 Claims, 20 Drawing Sheets

(51) Int. Cl.
*G06T 7/593* (2017.01)
*G06T 17/00* (2006.01)

(56) References Cited

U.S. PATENT DOCUMENTS

| | | | | |
|---|---|---|---|---|
| 6,106,561 | A * | 8/2000 | Farmer | G01V 1/282 |
| | | | | 703/10 |
| 6,445,390 | B1 * | 9/2002 | Aftosmis | G06T 17/20 |
| | | | | 345/420 |
| 6,529,192 | B1 * | 3/2003 | Waupotitsch | G06T 11/001 |
| | | | | 345/419 |
| 7,804,498 | B1 * | 9/2010 | Graham | G06T 11/206 |
| | | | | 345/419 |
| 9,047,660 | B2 * | 6/2015 | Khurd | G06T 7/0012 |
| 10,000,000 | B2 | 6/2018 | Marron | |
| 10,026,218 | B1 * | 7/2018 | Mertens | H04N 13/332 |
| 10,388,045 | B2 * | 8/2019 | Batra | G06T 11/203 |
| 2002/0034251 | A1 * | 3/2002 | Suzuki | H04N 19/18 |
| | | | | 375/240.16 |
| 2003/0067461 | A1 * | 4/2003 | Fletcher | G06T 17/20 |
| | | | | 345/420 |
| 2005/0243088 | A1 * | 11/2005 | Lengyel | G06T 15/04 |
| | | | | 345/420 |
| 2006/0094951 | A1 * | 5/2006 | Dean | A61F 2/30942 |
| | | | | 600/407 |
| 2006/0210146 | A1 * | 9/2006 | Gu | G01B 11/25 |
| | | | | 382/154 |
| 2007/0291233 | A1 | 12/2007 | Culbertson et al. | |
| 2010/0290698 | A1 | 11/2010 | Freedman et al. | |
| 2011/0310101 | A1 * | 12/2011 | Prange | G01V 99/00 |
| | | | | 345/420 |
| 2012/0257016 | A1 | 10/2012 | Nakajima et al. | |
| 2013/0083021 | A1 * | 4/2013 | Cohen | G06T 17/00 |
| | | | | 345/420 |
| 2013/0127857 | A1 * | 5/2013 | Carr | G06T 17/20 |
| | | | | 345/423 |
| 2013/0162637 | A1 * | 6/2013 | Son | G03H 1/2294 |
| | | | | 345/419 |
| 2013/0201187 | A1 * | 8/2013 | Tong | G06K 9/6255 |
| | | | | 345/420 |
| 2013/0249909 | A1 * | 9/2013 | Thompson | G06T 17/05 |
| | | | | 345/420 |
| 2014/0267262 | A1 * | 9/2014 | Masry | G06T 17/20 |
| | | | | 345/423 |
| 2014/0369584 | A1 * | 12/2014 | Fan | A61B 5/1079 |
| | | | | 382/131 |
| 2015/0213617 | A1 | 7/2015 | Kim et al. | |
| 2018/0120478 | A1 * | 5/2018 | Imhof | G01V 99/005 |
| 2018/0211373 | A1 * | 7/2018 | Stoppa | G06T 7/55 |
| 2019/0152152 | A1 * | 5/2019 | O'Leary | B33Y 10/00 |
| 2019/0197711 | A1 * | 6/2019 | MacRae | G06T 19/00 |

OTHER PUBLICATIONS

Wang et al., "A Region Based Stereo Matching Algorithm Using Cooperative Optimization", [online], [retrieved on Jun. 28, 2018]. Retrieved from the Internet: URL: <http://vision.middlebury.edu/stereo/eval/papers/CORegion.pdf>, 8 pages.

"Delaunay Triangulation", [online], [retrieved on Jun. 26, 2018]. Retrieved from the Internet: URL: <https://www.mathworks.com/help/matlab/math/delaunay-triangulation.html>, pp. 1-23.

Wong, "How Microsoft's PrimeSense-based Kinect Really Works", [online], Mar. 16, 2011, [retrieved on Jun. 26, 2018]. Retrieved from the Internet: URL: <http://www.electronicdesign.com/print/52126>, pp. 1-5.

MacCormick, "How does the Kinect work?", [online], [retrieved on Jun. 26, 2018]. Retrieved from the Internet: URL: <https://users.dickinson.edu/~jmac/selected-talks/kinect.pdf>, 52 pages.

Maluf et al., "Laser-Camera Vision Sensing for Spacecraft Mobile Robot Navigation", [online], [retrieved on Jun. 26, 2018]. Retrieved from the Internet: URL: <http://citeseerx.ist.psu.edu/viewdoc/download; sessionid=B95134793F6289D00222B25B5C803231?doi=10.1.1.154.6170&rep=rep1&type=pdf>, 6 pages.

Sokolova et al., "Experiments in Stereo Vision", [online], [retrieved on Jul. 6, 2018]. Retrieved from the Internet: URL: <http://disparity.wikidot.com/>, pp. 1-16.

Zhang et al., "Stereo Matching Algorithm Based on 2D Delaunay Triangulation", [online], May 26, 2015, [retrieved on Jun. 5, 2018]. Retrieved from the Internet: URL: <https://www.hindawi.com/journals/mpe/2015/137193/>, 9 pages.

Oliveira et al., "Incremental texture mapping for autonomous driving", [online], Robotics and Autonomous Systems 84, 2016, [retrieved on Jun. 26, 2018]. Retrieved from the Internet: URL: <http://refbase.cvc.uab.es/files/OSS2016b.pdf>, pp. 113-128.

MIT Technology Review, "50 Disruptive Companies—PrimeSense", [online], 2013, v. 113.02.21, [retrieved on Jun. 26, 2018]. Retrieved from the Internet: URL: <http://www2.technologyreview.com/tr50/primesense/>, pp. 1-3.

Seitz, "An Overview of Passive Vision Techniques", [online], [retrieved on Jun. 26, 2018]. Retrieved from the Internet: URL: <ttp://www.cs.cmu.edu/~seitz/course/SIGG99/papers/seitz-passive-abs.pdf>, pp. 1-3.

Shi et al., Good Features to Track:, [online], IEEE Conference on Computer Vision and Pattern Recognition (CVPR94), Seattle, Jun. 1994, [retrieved on Jun. 26, 2018]. Retrieved from the Internet: URL: <http://www.ai.mit.edu/courses/6.891/handouts/shi94good.pdf>, 8 pages.

Simena et al., "A Review on Delaunay Triangulation With Application On Computer Vision", [online], International Journal of Computer Science and Engineering (IJCSE) vol. 3, Issue 2, Mar. 2014, [retrieved on Jun. 26, 2018]. Retrieved from the Internet: URL: <https://www.researchgate.net/publication/268810228_A_REVIEW_ON_DELAUNAY_TRIANGULATION_WITH_APPLICATION_ON_COMPUTER_VISION>, 11 pages.

Iocchi, "Stereo Vision: Triangulation", [online], Apr. 6, 1998, [retrieved on Jun. 28, 2018]. Retrieved from the Internet: URL: <http://www.dis.uniroma1.it/~iocchi/stereo/triang.html>, pp. 1-6.

"Time-of-Flight (ToF) sensors", [online], [retrieved on Jun. 26, 2018]. Retrieved from the Internet: URL: <http://www.ti.com/sensors/specialty-sensors/time-of-flight/overview.html>, pp. 1-3.

Wikipedia, "Computer stereo vision", [online], Apr. 16, 2018, [retrieved on Jun. 26, 2018]. Retrieved from the Internet: URL: <https://en.wikipedia.org/w/index.php?title=Computer_stereo_vision&printable=yes>, pp. 1-7.

Wikipedia, "Lidar", [online], Jun. 24, 2018, [retrieved on Jun. 26, 2018]. Retrieved from the Internet: URL: <https://en.wikipedia.org/wiki/Lidar>, pp. 1-28.

Wikipedia, "Triangulation (computer vision)", [online], Jan. 23, 2018, [retrieved on Jun. 26, 2018]. Retrieved from the Internet: URL: <https://en.wikipedia.org/w/index.php?title=Triangulation_(computer_vision)&printable=yes>, pp. 1-5.

Shepherd, "Zebedee", [online], Jul. 13, 2016, [retrieved on Jun. 26, 2018]. Retrieved from the Internet: URL: <https://research.csiro.au/robotics/zebedee/>, pp. 1-4.

\* cited by examiner

THREE-DIMENSIONAL COMPUTER VISION BASED ON PROJECTED PATTERN OF LASER DOTS AND GEOMETRIC PATTERN MATCHING

TECHNICAL FIELD

The present disclosure generally relates to three-dimensional computer vision based on a projected pattern of laser dots and geometric pattern matching.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Three-dimensional (3D) artificial vision is a key feature that is being pursued in many computer-based devices (e.g., user interface devices and machine-based control devices) that are increasingly relying on artificial intelligence (AI) applications: examples deployments of such computer-based devices can include self-driving cars (i.e., "driverless" cars), robotic-based devices or systems, virtual reality (VR) based user interface devices, and other computer-based devices utilizing location services based WiFi signals and/or 4G/LTE signals. The 3D artificial vision attempts to construct a 3D model of a surrounding physical environment, in order to enable a computer-based device to interact with its surrounding physical environment by executing physical environmentally interactive operations such as object recognition, obstacle avoidance, traffic navigation, and indoor 3D mapping, etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
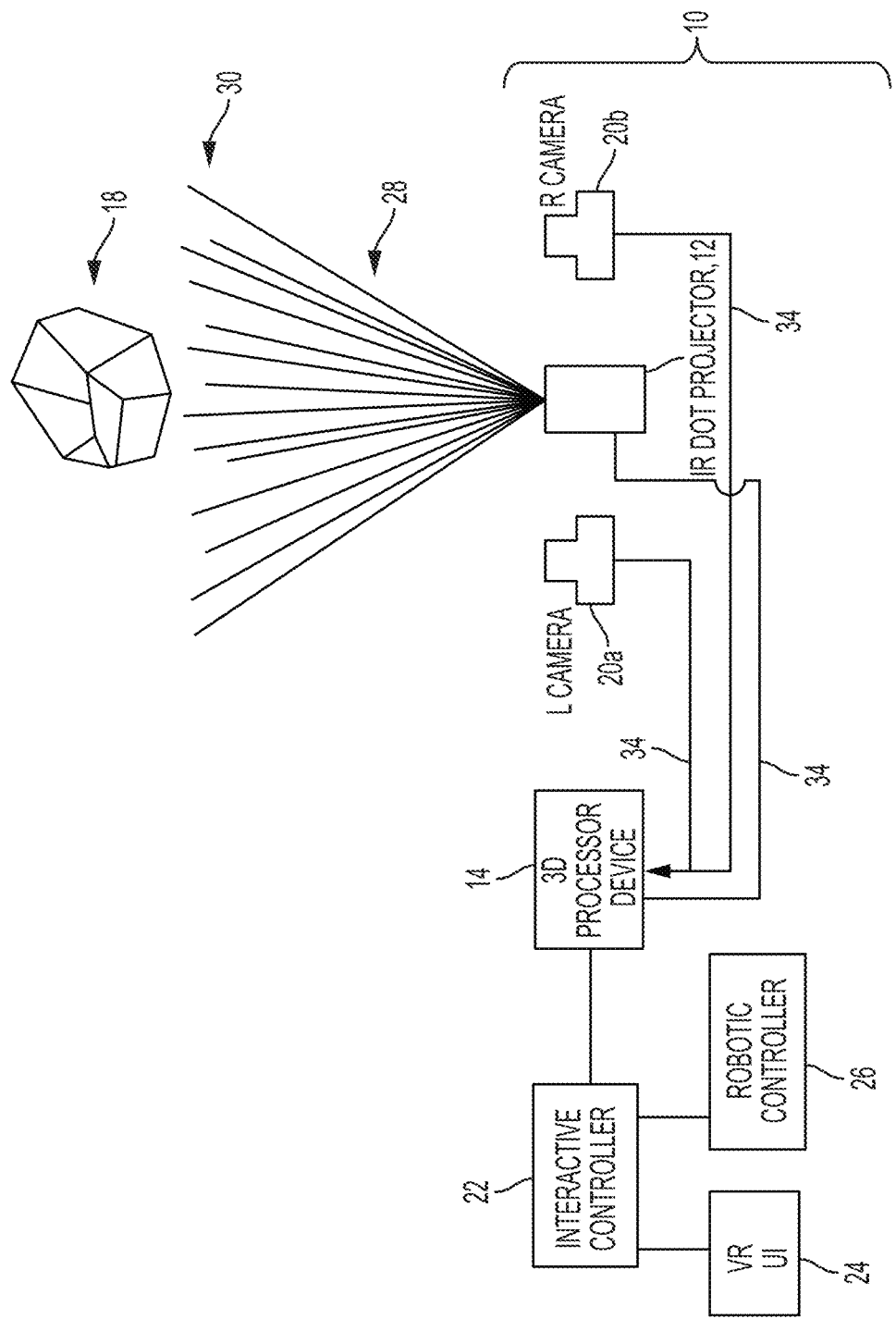
FIG. 1 illustrates an example system comprising a laser dot projector and an apparatus configured for generating a three-dimensional model of a physical environment detected using a projected pattern of laser dots and geometric (e.g., triangle) pattern matching, according to an example embodiment.

In one embodiment, a method comprises: obtaining, by a computing device, first and second images comprising a projected pattern of laser dots detected by respective camera devices in a physical environment; generating, by the computing device from the first and second images, a stereoscopic two-dimensional (2D) object pair, comprising determining 2D positions for each of the laser dots detected in the first and second images, creating a first mesh of geometric patterns from the 2D positions in the first image and a corresponding second mesh of the geometric patterns from the 2D positions in the second image, and creating the stereoscopic 2D object pair based on matching corresponding geometric patterns from the first and second meshes of the geometric patterns; and generating, by the computing device, a three-dimensional model (3D) of the physical environment, comprising 3D positions for the laser dots detected in the physical environment, based on executing stereoscopic triangulation of the stereoscopic 2D object pair, the 3D model causing a controllable device to interact with the physical environment.

In another embodiment, an apparatus implemented as a physical machine comprises non-transitory machine readable media configured for storing executable machine readable code; a device interface circuit configured for receiving image data from camera devices; and a processor circuit configured for executing the machine readable code, and when executing the machine readable code operable for: obtaining first and second images comprising a projected pattern of laser dots detected by the respective camera devices in a physical environment, generating, from the first and second images, a stereoscopic two-dimensional (2D) object pair, comprising determining 2D positions for each of the laser dots detected in the first and second images, creating a first mesh of geometric patterns from the 2D positions in the first image and a corresponding second mesh of the geometric patterns from the 2D positions in the second image, and creating the stereoscopic 2D object pair based on matching corresponding geometric patterns from the first and second meshes of the geometric patterns, and generating a three-dimensional model (3D) of the physical environment, comprising 3D positions for the laser dots detected in the physical environment, based on executing stereoscopic triangulation of the stereoscopic 2D object pair, the 3D model causing a controllable device to interact with the physical environment.

In another embodiment, one or more non-transitory tangible media encoded with logic for execution by a machine and when executed by the machine operable for: obtaining, by the machine implemented as a computing device, first and second images comprising a projected pattern of laser dots detected by respective camera devices in a physical environment; generating, by the computing device from the first and second images, a stereoscopic two-dimensional (2D) object pair, comprising determining 2D positions for each of the laser dots detected in the first and second images, creating a first mesh of geometric patterns from the 2D positions in the first image and a corresponding second mesh of the geometric patterns from the 2D positions in the second image, and creating the stereoscopic 2D object pair based on matching corresponding geometric patterns from the first and second meshes of the geometric patterns; and generating, by the computing device, a three-dimensional model (3D) of the physical environment, comprising 3D positions for the laser dots detected in the physical environment, based on executing stereoscopic triangulation of the stereoscopic 2D object pair, the 3D model causing a controllable device to interact with the physical environment.

DETAILED DESCRIPTION

Particular embodiments provide a low-cost and efficient system for generating a computer-generated three-dimensional (3D) model of a physical environment based on generating three-dimensional positions from first and second (e.g., Left and Right (L/R)) images of a pattern of laser dots, for example a pseudo-randomized pattern of laser dots. The particular embodiments provide a low-cost system that can construct the 3D model of the physical environment with an accuracy in depth of about one millimeter (1 mm) or less at a depth (i.e., in a Z axis) of two meters, while providing a detection range of up to hundreds of meters. The particular embodiments can cause a controllable device to interact with the physical environment, for example controllable devices including self-driving vehicles (e.g., driverless vehicles, unmanned aerial vehicles, etc.), robotic-based devices or systems in a manufacturing facility, virtual reality based user interface devices, etc.

Moreover, the use of the pattern of laser dots and dot pattern matching enables the particular embodiments to generate the 3D model of the physical environment based on executing "fast" dot pattern matching, without the substantial processing burdens normally encountered in image processing, such as feature extraction, pixel-by-pixel pattern matching, etc.

Further, dot pattern matching between the first and second images can be executed based on creating meshes of geometric patterns (e.g., triangles) from the respective first and second images, and creating a stereoscopic two-dimensional (2D) object pair based on matching corresponding geometric patterns from the first and second meshes of the geometric patterns. Hence, dot pattern matching can be executed by the example embodiments between the first and second images without the necessity for more processing-intensive methods. Triangles are illustrated herein as an example of the geometric patterns that can be used for generation of a 2D triangle object pair, first and second meshes of triangles, and a generated stereoscopic 2D triangle object pair.

Hence, the example embodiments can provide a compact system that can generate a 3D model of a physical environment over a range of hundreds of meters, with high resolution and accuracy (1 mm at 2 meters), using one or more inexpensive laser dot projectors (e.g., infrared laser projectors) generating a pattern of laser dots that can be detected by two or more low-cost cameras, and using efficient processing that can bypass more complex image processing techniques such as feature point extraction or pixel-by-pixel pattern matching. The example embodiments also are compatible with other image optimization techniques that can further optimize the generation of the 3D model in various real-world environments. Hence, the example embodiments provide an economical 3D computer "vision" that can provides a 3D model of the physical environment that enable computer-based devices to physically interact with their surrounding physical environment.

FIG. 1 is a diagram illustrating an example 3D computer vision system 10 comprising a visible or infrared (IR) laser dot projector 12 and an apparatus 14 configured for generating a three-dimensional model (16 of FIG. 17) and/or a three-dimensional image (17 of FIG. 9A) of a physical environment (e.g., physical object 18 of FIG. 1 or FIG. 9B), according to an example embodiment. The apparatus 14, also referred to herein as a 3D processor device, is a physical machine (i.e., a hardware device) configured for implementing communications with other physical machines in the 3D computer vision system 10, and executing operations described herein for generation of the 3D model 16. The term "configured for" or "configured to" as used herein with respect to a specified operation refers to a device and/or machine that is physically constructed and arranged to perform the specified operation.

The 3D computer vision system 10 can comprise the laser dot projector 12, the 3D processor device 14, two or more camera devices 20 (e.g., left camera 20a and right camera 20b), an interactive controller device 22, a virtual reality (VR) user device 24, and/or a robotic controller device 26 (e.g., an automated controller device such as a self-driving vehicle artificial intelligence (AI) controller. As described in further detail below, the laser dot projector 12 is configured for outputting a plurality laser beams 28, also referred to herein as a laser beam pattern 28. The laser beams 28 can be emitted at visible wavelengths or infrared (IR) wavelengths:

use of infrared wavelengths advantageously can be used in driverless car applications without causing visual interference or distracting visual "pollution" for individuals in the general physical environment 30 surrounding the physical object 18. The laser beam pattern 28 can create a pattern of laser dots (32a, 32b of FIG. 5) based on the laser beam pattern 28 illuminating the physical object 18 and other physical objects in the physical environment 30.

The camera devices 20a and 20b are separated by at least a prescribed distance (e.g., about six inches) that enables the camera devices to capture respective images of the pattern of laser dots 32a, 32b at different perspectives (the pattern of laser dots 32a, 32b also can be referred to as a "mesh" of laser dots). Each camera device 20a and 20b can detect the pattern of laser dots 32 illuminated on the physical object 18 (and other physical objects in the physical environment 30) and send corresponding image data 32a and 32b to the 3D processor device 14 via a data link 34. The 3D processor device 14, in response to receiving the pattern of laser dots 32a and 32b, can generate the 3D model 16, without relying on complex image processing techniques such as feature point extraction or pixel-by-pixel pattern matching.

In particular, one attempt at 3D vision includes capturing stereoscopic 2D images using passive sensors such as cameras, and relying on pixel pattern matching and other visual features to calculate 3D models from 2D images. This attempt requires complex algorithms that requires substantial computing resources; moreover, this attempt provides poor accuracy under many conditions, for example in low light conditions or when objects in the physical environment have flat surfaces without any patterns/features.

Another attempt at 3D vision, referred to as Light Detection and Ranging (LIDAR) utilizes active sensors (e.g., rotating laser beams) that emit probing signals such as laser pulses to measure distances: the LIDAR system measures distances by measuring the difference in time for a signal to return following transmission and reflection by a physical object. Rotating mirrors are needed to direct a laser beam in different directions for each sampling of the laser beam, requiring expensive equipment that can precisely measure the time elapsed between the laser beam traveling (at the speed of light) from the laser projector, to the object being analyzed, and back to the detector. Moreover, only one point at a time can be measured, requiring a repeating of the distance measurement operation on a point-by-point basis. Hence, existing attempts to deploy LIDAR to scan a physical environment to construct a 3D object suffer from the disadvantage that existing LIDAR systems are complex, bulky, and expensive and thus are not economical for large-scale commercial deployment.

In another attempt at 3D vision, the PrimeSense system uses infrared light to construct the 3D model of nearby objects such as a user' face. The PrimeSense system uses a small infrared dot projector and a diffractive lens to diffract the infrared beam into a prescribed shape (e.g., a circle or ellipse), and CMOS sensors detect changes in the prescribed shape as a physical moves closer to or farther from the infrared dot projector. The PrimeSense system, however, has a limited range of only a few meters because the prescribed shape becomes distorted at further distances and cannot be detected for analysis; further, the numerous sensors can interfere with each other; hence, the PrimeSense system is not suitable for systems (e.g., self-driving cars) requiring longer detection ranges.

As described in further detail below, the example embodiments provides a cost-effective system for generating a 3D model based on obtaining first and second images of a projected pattern of laser dots having been emitted on a physical object in a physical environment, and executing geometric pattern-based pattern matching and stereoscopic triangulation to determine distances to the laser dots for generation of the 3D model.

Figure 2:
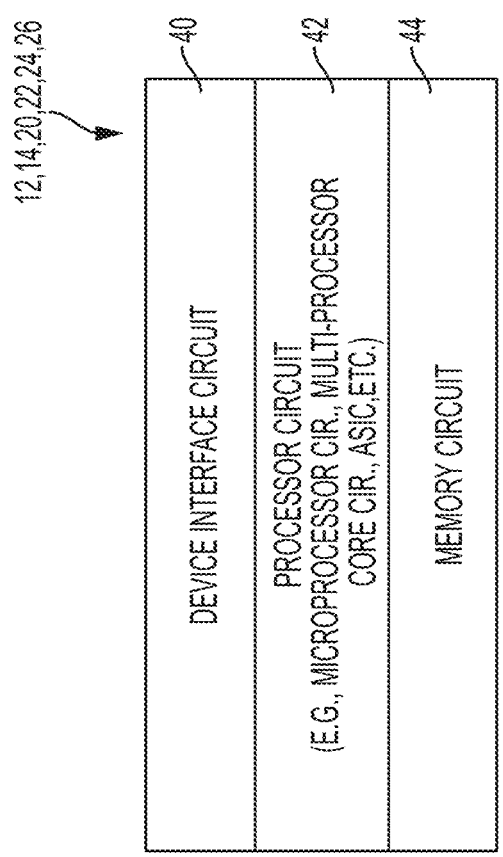
FIG. 2 illustrates an example implementation of the apparatus configured for generating a three-dimensional model of the physical environment detected using a projected pattern of laser dots and triangle pattern matching, according to an example embodiment.

FIG. 2 illustrates an example implementation of any one of the devices 12, 14, 20, 22, 24, and/or 26 of FIG. 1, according to an example embodiment.

Each apparatus 12, 14, 20, 22, 24, and/or 26 can include at least a device interface circuit 40, a processor circuit 42, and a memory circuit 44. The device interface circuit 40 can include one or more distinct physical layer transceivers for communication with any one of the other devices 12, 14, 20, 22, 24, and/or 26; the device interface circuit 40 also can include an IEEE based Ethernet transceiver for communications with the devices of FIG. 1 via any type of data link (e.g., a wired or wireless link, an optical link, etc.) 34. The processor circuit 42 can be configured for executing any of the operations described herein, and the memory circuit 44 can be configured for storing any data or data packets as described herein.

Any of the disclosed circuits of the devices 12, 14, 20, 22, 24, and/or 26 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
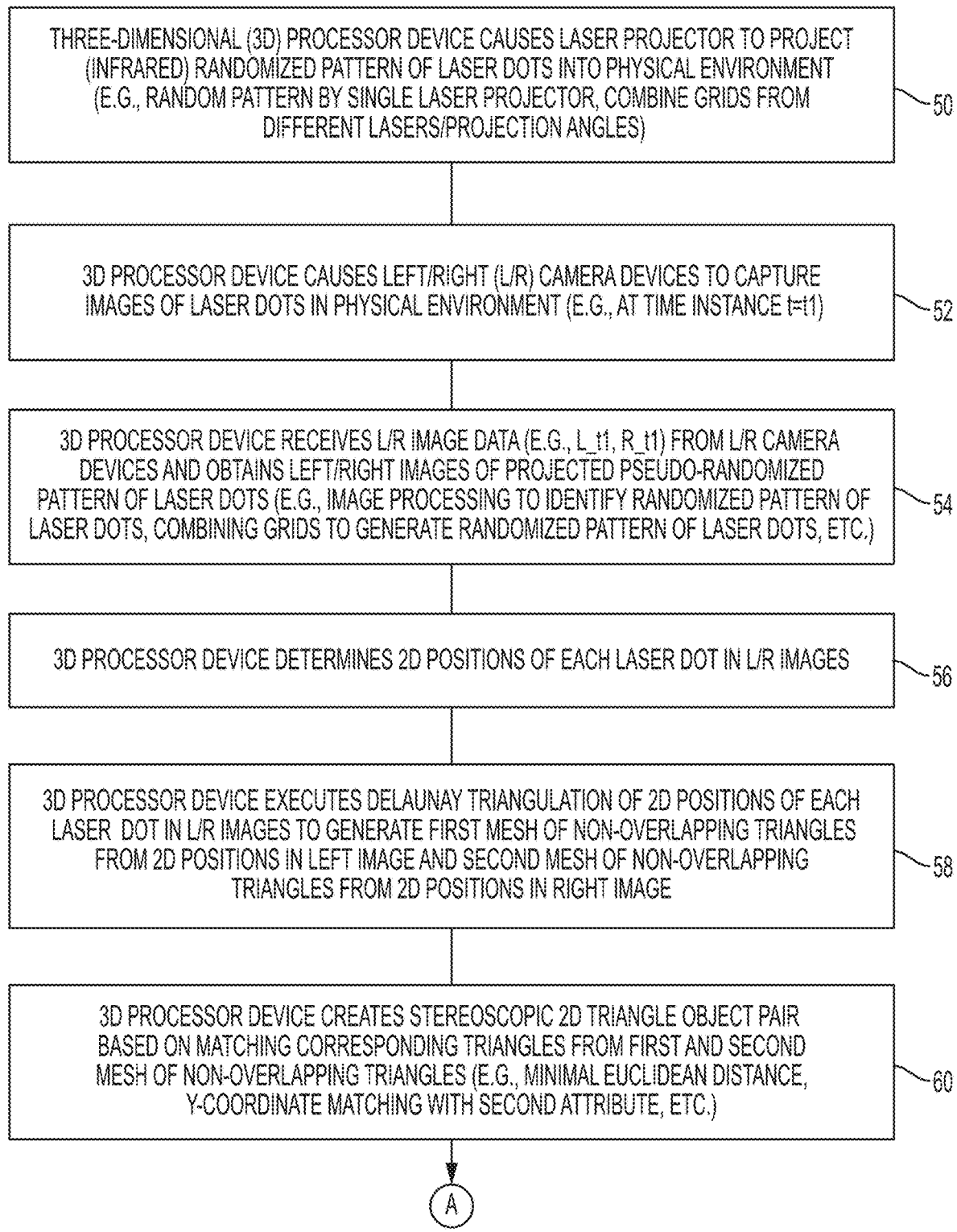
FIGS. 3A and 3B summarize a method of generating a three-dimensional model of the physical environment detected using a projected pattern of laser dots and triangle pattern matching, according to an example embodiment.
Figure 3B:
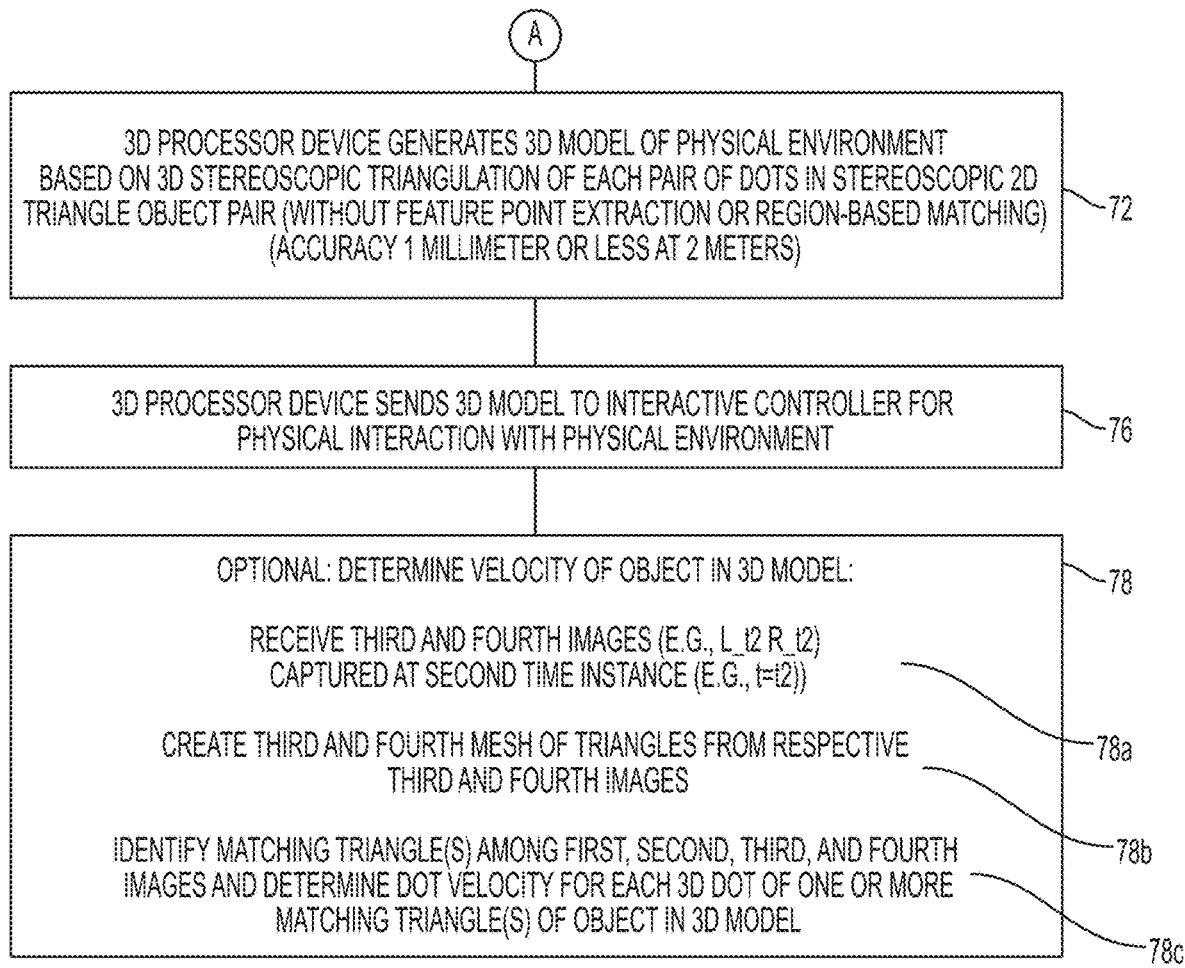
Figure 4A:
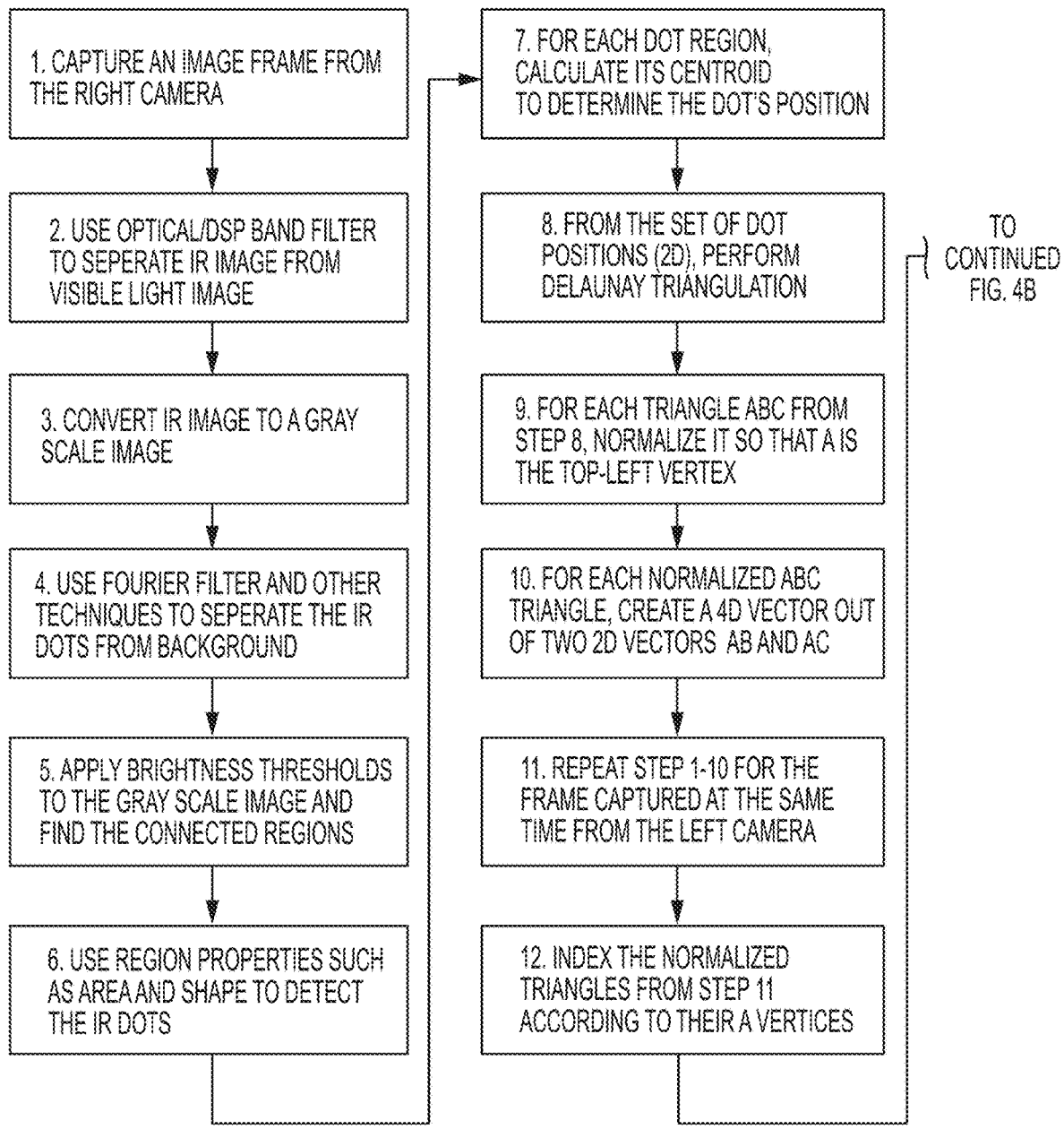
FIG. 4 illustrates an example implementation of the method of FIGS. 3A and 3B, according to an example embodiment.
Figure 4B:
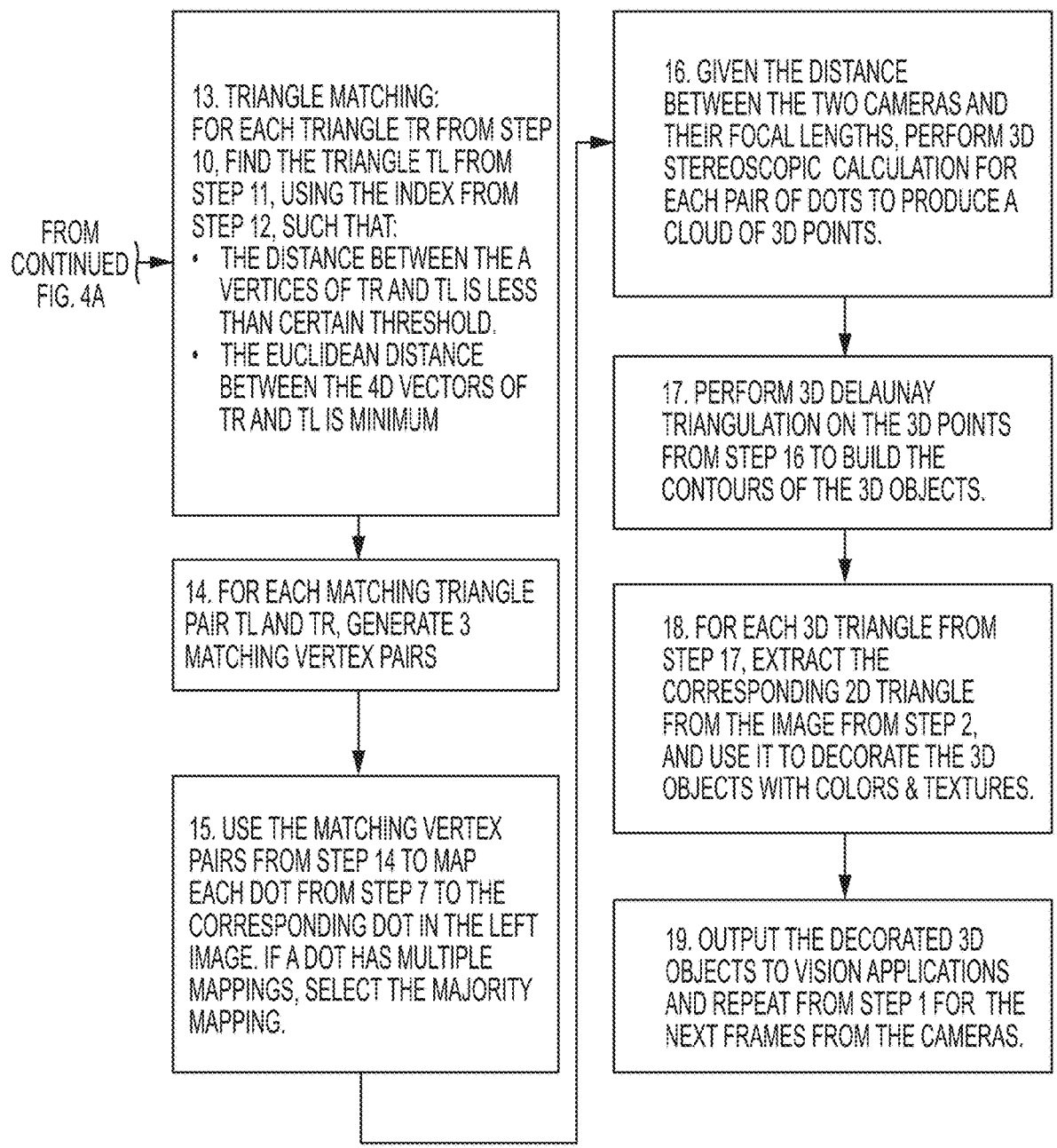

FIGS. 3A and 3B summarize a method of generating a three-dimensional model of the physical environment detected using a projected pattern of laser dots, according to an example embodiment. FIG. 4 illustrates an example implementation of the method of FIGS. 3A and 3B, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the processor circuit 42 of the 3D processor device 14 in operation 50 can be configured for causing the laser dot projector 12 to project an infrared (or visible) randomized pattern of laser dots into the physical environment 30 by transmission of the laser beam pattern 28. In one embodiment, a single laser dot projector 12 can be configured for emitting a randomized pattern (e.g., an irregular pattern) of laser dots into the physical environment 30, either independent of the 3D processor device 14 or under control of the 3D processor device 14; in another embodiment, the processor circuit 42 of the 3D processor device 14 in operation 50 can cause generation of the randomized pattern, using a laser device configured for generating a grid laser beam pattern, by combining grids from different laser devices in which each laser device to rotates its grid pattern to a different angle. Hence, if a laser dot projector is preconfigured for transmitting a grid-like dot pattern, a pseudo-random dot pattern can be generated by using laser dot projectors to project grid-like patterns at different angles, and combining the grids transmitted at the different angles to form the pseudo-random dot pattern. Dot patterns other than the pseudo-randomized pattern also can be used as the projected pattern of laser dots.

The processor circuit 42 of the 3D processor device 14 in operation 52 can cause the camera devices 20*a* and 20*b* to capture the images of the pattern of laser dots 32 in the physical environment 30 (e.g., operation "1" of FIG. 4), for example based on outputting a sync command simultaneously to the camera devices 20*a* and 20*b* at a time instance "t=t1". The device interface circuit 40 of the 3D processor device 14 is configured for receiving in operation 54 the image data from the camera devices 20*a* and 20*b* that was captured at the time instance "t=t1", for example the image "L_t1" captured by the camera device 20*a*, and the image "R_t1" captured by the camera device 20*b*.

Figure 5:
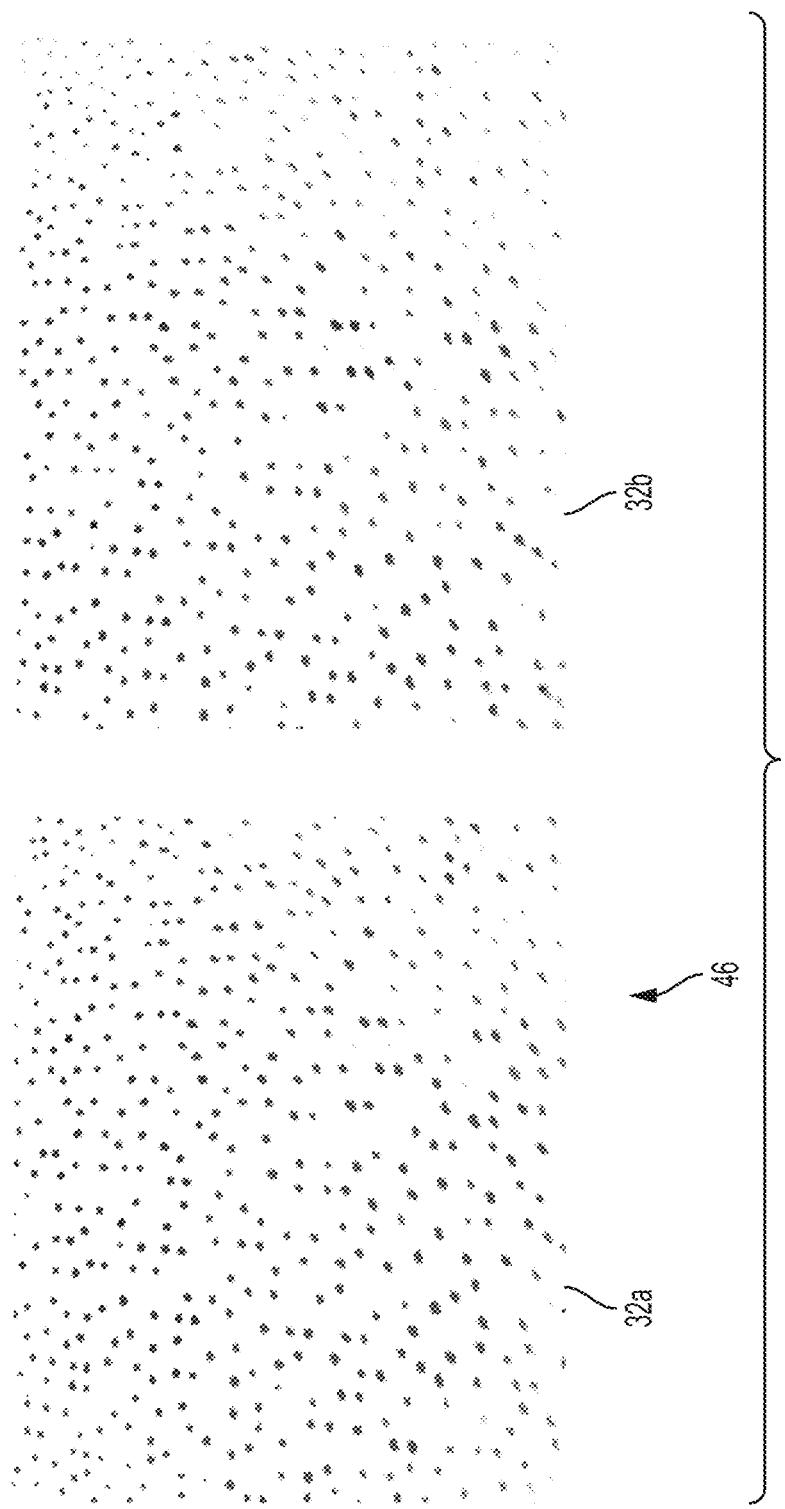
FIG. 5 illustrates an example stereoscopic image pair (illustrated as black/white and inverted), generated by the apparatus of FIG. 1, of a projected pattern of pseudo-randomized laser dots detected by the camera devices of FIG. 1, according to an example embodiment.

FIG. 5 illustrates an example stereoscopic image pair (illustrated as black/white and inverted as a "negative" image of the original image) 46 comprising the image "L_t1" of the pattern of laser dots 32*a* captured by the camera device 20*a*, and the image "R_t1" of the pattern of laser dots 32*b* captured by the camera device 20*b*. The processor circuit 42 of the 3D processor device 14 in operation 54 can execute various image processing techniques to obtain the left/right images of the projected pseudo-randomized pattern of laser dots 32, including combining the above-identified grids (from operation 50 and 52): dot patterns can be combined by the 3D processor device 14 from images captured substantially at the same time (e.g., within a tenth of a second) to form the images "L_t1" and "R_t1". Example image processing techniques that can be applied in operation 54 also can include frequency domain filtering, color-filtering operations, color-enhancement operations, and/or contrast-enhancement and/or adaptive thresholding operations to distinguish laser dots from background colors or bright lights that interfere with the laser dots (e.g., operations "2" through "6" of FIG. 4). Additional optional operations can be executed to identify additional "dots" in the images of the pattern of laser dots 32*a* and 32*b*, for example Shi-Tomasi Corner Detection for detection of corners and/or edges in the left/right images in addition to the laser beam pattern 28.

Hence, the processor circuit 42 of the 3D processor device 14 in operation 56 can determine the 2D positions of each laser dot of the pattern of laser dots 32*a*, 32*b* in the respective left/right images (e.g., operation "7" of FIG. 4). The 2D positions can be stored by the processor circuit 42 of the 3D processor device 14 in a data structure in the memory circuit 44 of the 3D processor device 14.

Figure 6:
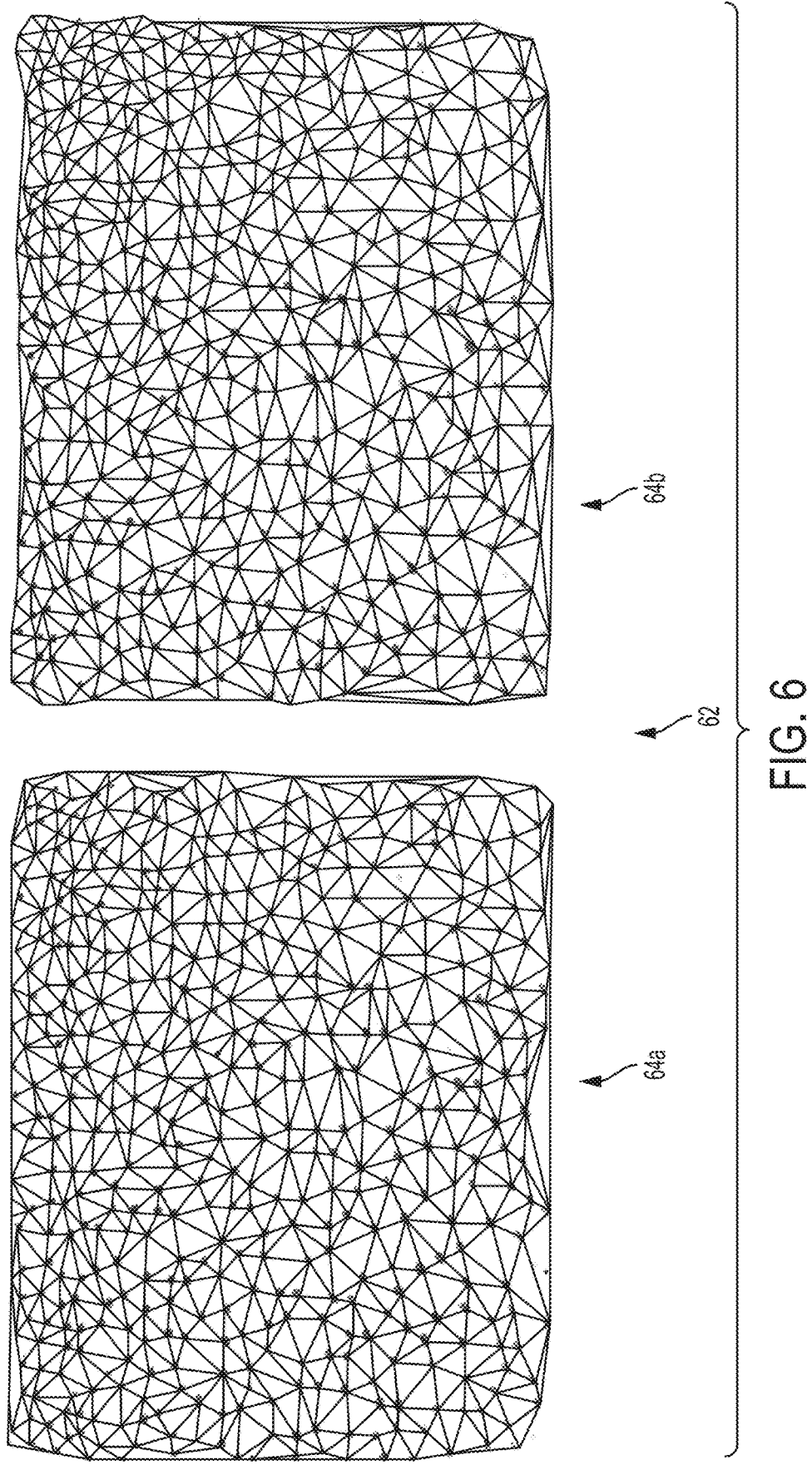
FIG. 6 illustrates an example stereoscopic mesh pair of geometric patterns such as triangles (illustrated as black/white and inverted), generated by the apparatus of FIG. 1 executing triangulated mapping (e.g., Delaunay triangulation) on the stereoscopic image of FIG. 5, according to an example embodiment.

The processor circuit 42 of the 3D processor device 14 executes operations 58 and 60 for formation of a stereoscopic 2D object pair such as a stereoscopic 2D triangle object pair 62 (illustrated in FIG. 7), based on matching laser dots from the pattern of laser dots 32*a* and the pattern of laser dots 32*b* by executing matching of 2D geometric patterns (e.g., matching of 2D triangles) between the pattern of laser dots 32*a* and 32*b*. In particular, the processor circuit 42 of the 3D processor device 14 in operation 58 creates a first mesh of geometric patterns (e.g., non-overlapping triangles (64*a* of FIG. 6)) from the 2D positions of each of the laser dots in the pattern of laser dots 32*a* in the left image of the stereoscopic image pair 46 of FIG. 5, and further creates in operation 58 a second mesh of non-overlapping geometric patterns (e.g., triangles (64*b* of FIG. 6)) from the 2D positions of each of the laser dots in the pattern of laser dots 32*b* in the right image of the stereoscopic image pair 46 of FIG. 5. The first and second meshes of non-overlapping 2D triangles 64*a*, 64*b* can be generated (i.e., created), for example based on the processor circuit 42 of the 3D processor device 14 executing Delaunay triangulation on the 2D positions generated in operation 56 for each of the laser dots in the pattern of laser dots 32*a*, 32*b*, respectively (e.g., operations "8" through "12" of FIG. 4). As illustrated in FIGS. 5 and 6, execution in operation 58 of Delaunay triangulation on the 2D positions of the laser dots in the pattern of laser dots 32a in the left image of the stereoscopic image pair 46 results in the mesh of non-overlapping 2D triangles 64a of the stereoscopic 2D triangle object pair 62, and execution of Delaunay triangulation on the 2D positions of the laser dots in the pattern of laser dots 32b in the right image of the stereoscopic image pair 46 results in the mesh of non-overlapping 2D triangles 64b of the stereoscopic 2D triangle object pair 62.

Figure 7:
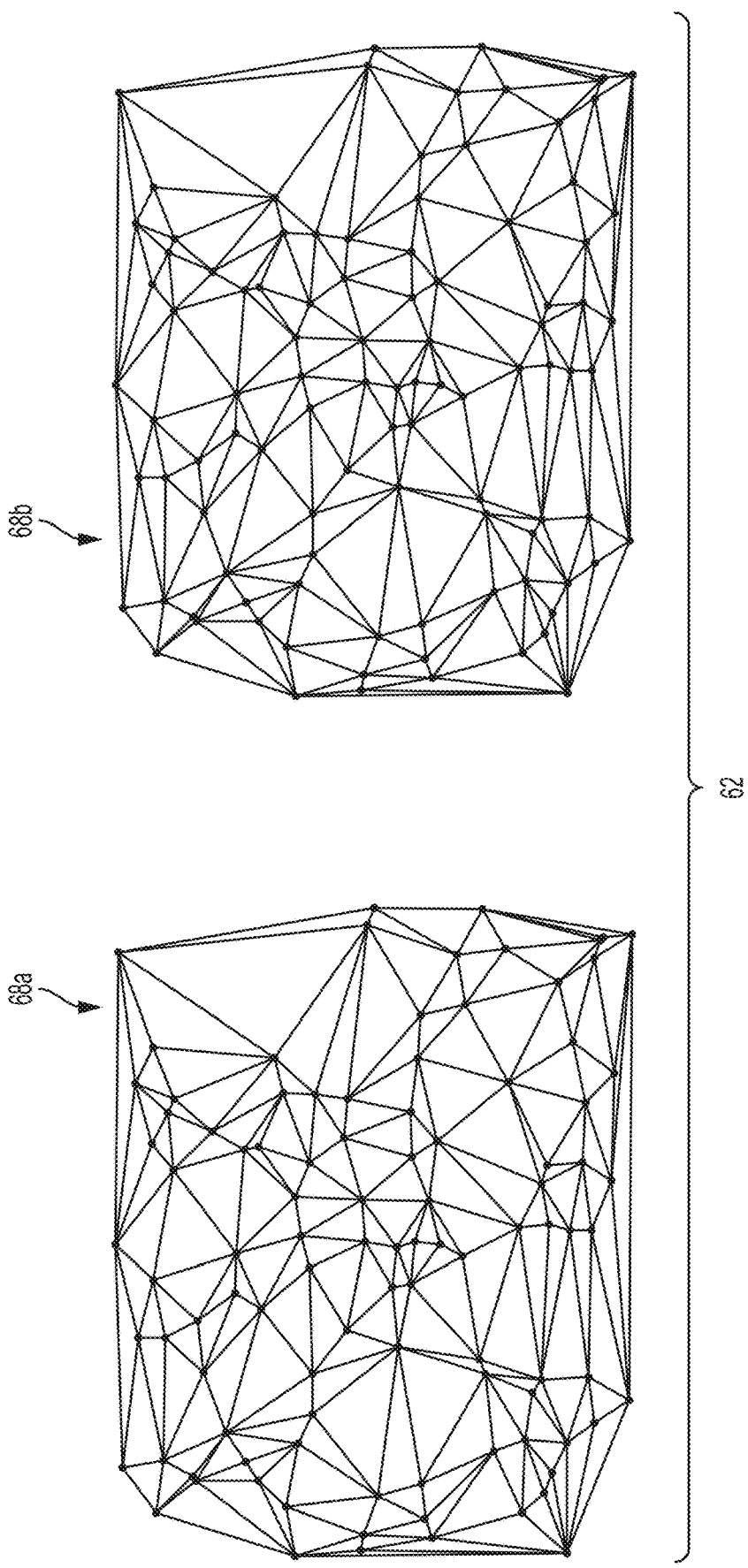
FIG. 7 illustrates an example stereoscopic two-dimensional (2D) object pair, generated by the apparatus of FIG. 1 for geometric pattern matching, according to an example embodiment.
Figure 8:
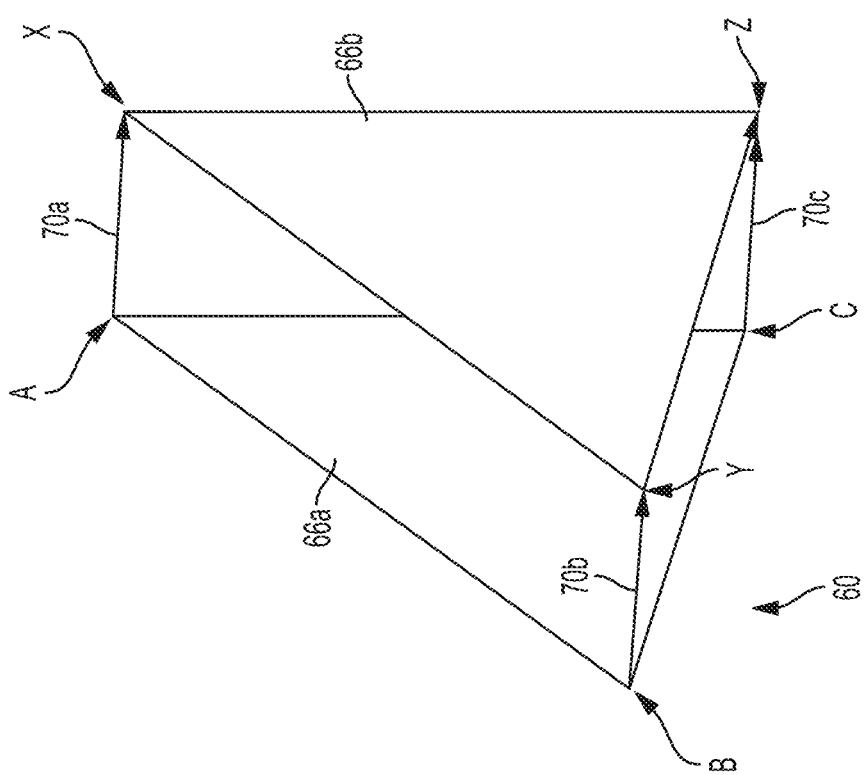
FIG. 8 illustrates an example triangular pattern matching, according to an example embodiment.

The processor circuit 42 of the 3D processor device 14 in operation 60 can create in operation 60 the stereoscopic 2D triangle object pair 62 of FIG. 7 based on executing pair-wise matching of corresponding triangles from the respective mesh of non-overlapping 2D triangles 64a, 64b. As illustrated in detail with respect to FIG. 8 (e.g., operations "13" through "15" of FIG. 4) and FIG. 15, the processor circuit 42 of the 3D processor device 14 in operation 14 can match a triangle 66a from the first mesh of non-overlapping 2D triangles 64a with a triangle 66b from the second mesh of non-overlapping 2D triangles 64b based on computing displacement vectors of the vertices of each pair of the triangles 66a, 66b. For example, the left triangle 66a comprises the 2D vertices "A, B, C" and the right triangle 66b comprises the 2D vertices "X, Y, and Z", where each vertex "A", "B", "C" has a corresponding 2D (e.g., "x", "y") coordinate in the mesh of non-overlapping 2D triangles 64a, and each vertex "X", "Y", "Z" has a corresponding 2D coordinate in the mesh of non-overlapping 2D triangles 64b. The processor circuit 42 of the 3D processor device 14 in operation 60 can execute the pair-wise matching of the triangles triangle 66a based on identifying, for each triangle 66a in the mesh of non-overlapping 2D triangles 64a from the Left image of the stereoscopic 2D triangle object pair 62, a corresponding triangle 66b in the mesh of non-overlapping 2D triangles 64b from the Right image of the stereoscopic 2D triangle object pair 62 having the closest resemblance or difference in geometric pattern shape, for example based on having a minimal Euclidean distance. For example, given the Left triangle "ABC" 66a represented by segments (AB, AC), the processor circuit 42 of the 3D processor device 14 in operation 60 can find the corresponding Right triangle "XYZ" 66b (represented by segments XY, XZ) that minimizes the Euclidean distance "sqrt ($|AB-XY|^2+|AC-XZ|^2$)", where the symbol "|" is used to denote an absolute value operation, and "sqrt" refers to a square root operation. In one embodiment, the search for a matching triangle 66b can be limited to a small area around the absolute position of the given triangle 66a (as opposed to a full search of all the triangles 66 in the entire mesh 64b). Prescribed rules can be established by the processor circuit 42 in operation 60 to improve computing efficiency, for example a rule may be set that a triangle may not have a match if its distance to the closest match exceed a prescribed threshold. Other matching techniques can be applied for non-matching triangles, including matching individual dots using their Y coordinates and the Y coordinates of their nearest neighbors using an additional matching attribute, such as dot shape, dot size, dot intensity etc.

In response to matching the triangle pairs 66a, 66b (and/or matching one or more pixel patterns around the dot), the processor circuit 42 of the 3D processor device 14 in operation 60 can create and store in the memory circuit 44 a data structure comprising list of matching dot pairs, for example the matching of triangle "ABC" 66a with the triangle "XYZ" 66b can cause the processor circuit 42 of the 3D processor device 14 to create the matching dot pairs "A-X" 70a, "B-Y" 70b, and "C-Z" 70c. Note that a dot may belong to more than one triangle, hence prescribed rules such as voting majority can be implemented to resolve any conflicts arising during dot pairing.

The processor circuit 42 of the 3D processor device 14 in operation 60 repeats matching of corresponding triangles 66a, 66b from the mesh of non-overlapping 2D triangles 64a, 64b (e.g., operations "13" through "15" of FIG. 4), until the formation of the stereoscopic 2D triangle object pair 62 of FIG. 7 comprising the 2D triangular object models 68a, 68b.

Referring to FIG. 3B, the processor circuit 42 of the 3D processor device 14 in operation 72 can generate a 3D model 16 of the physical environment 30 based on the processor circuit 42 executing 3D stereoscopic triangulation of each pair of dots in the stereoscopic 2D triangle object pair 62, without the necessity of feature point extraction or region-based matching (e.g., operation "16" of FIG. 4). For example, the processor circuit 42 of the 3D processor device 14 in operation 72 can generate a 3D coordinate dot based on executing a 3D stereoscopic calculation for each pair of matching dot pairs 70 collected in operation 60. For example, for any point P of some object in the real world, P1 and P2 are pixel point representations of P in the images IP1 and IP2 as taken by cameras C1 and C2. F is the focal length of the camera (distance between lens and film). B is the offset distance between cameras C1 and C2. V1 and V2 are the horizontal placement of the pixel points with respect to the center of the camera. The disparity of the points P1 and P2 from image to image can be calculated by taking the difference of V1 and V2. This is the equivalent of the horizontal shift of point P1 to P2 in the image planes. Using this disparity one can calculate the actual distance "D" of the point in the real world from the images. In other words, if D=Distance of point in real world, b=base offset, f=focal length of camera, and d=disparity, then the distance "D" equals "D=bf/d".

Figure 16:
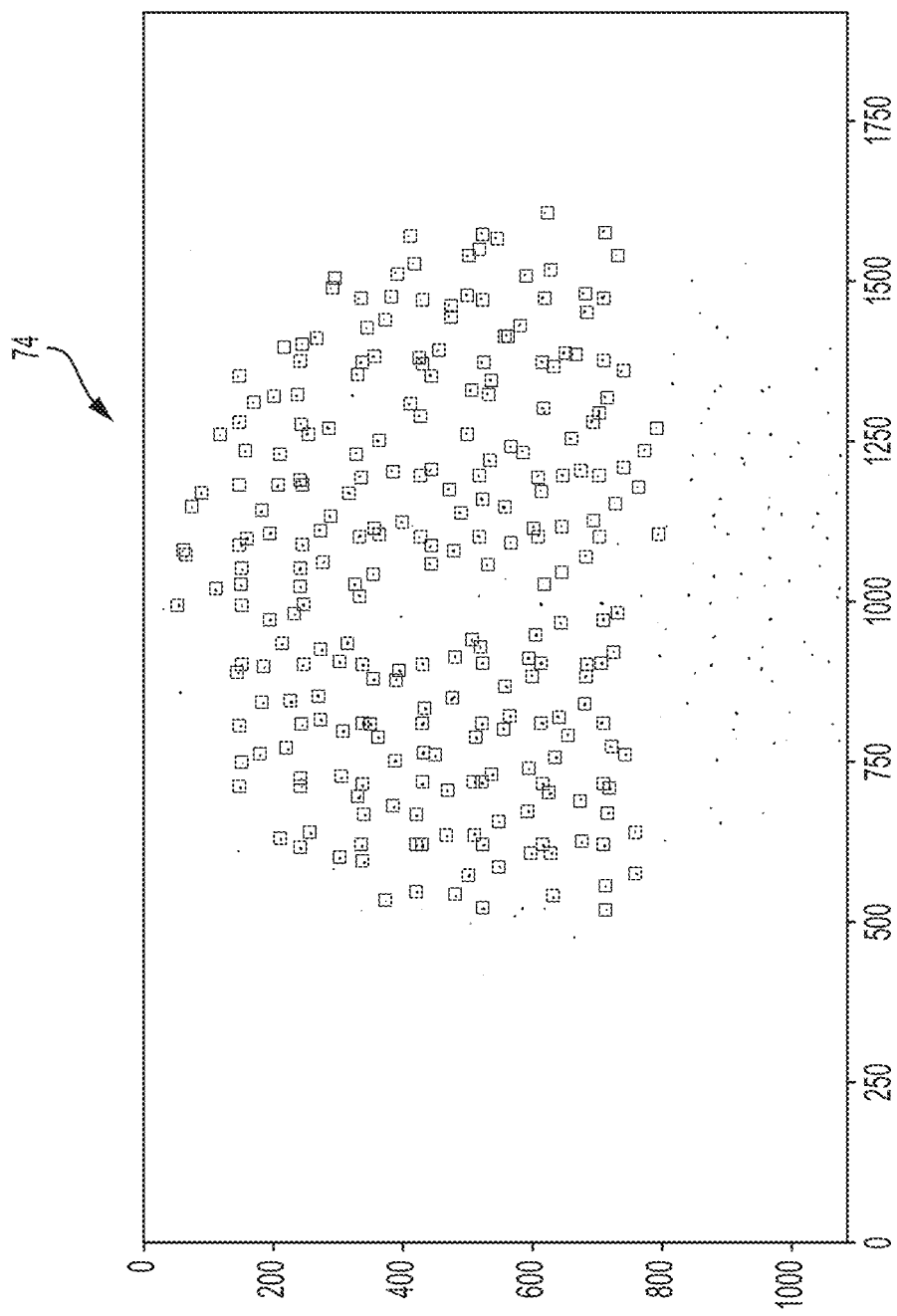
FIG. 16 illustrates an image of matching laser dots used to generate a 3D model of the physical object in the physical environment capture in FIG. 12, according to the example working model of the embodiment of FIG. 12.
Figure 17:
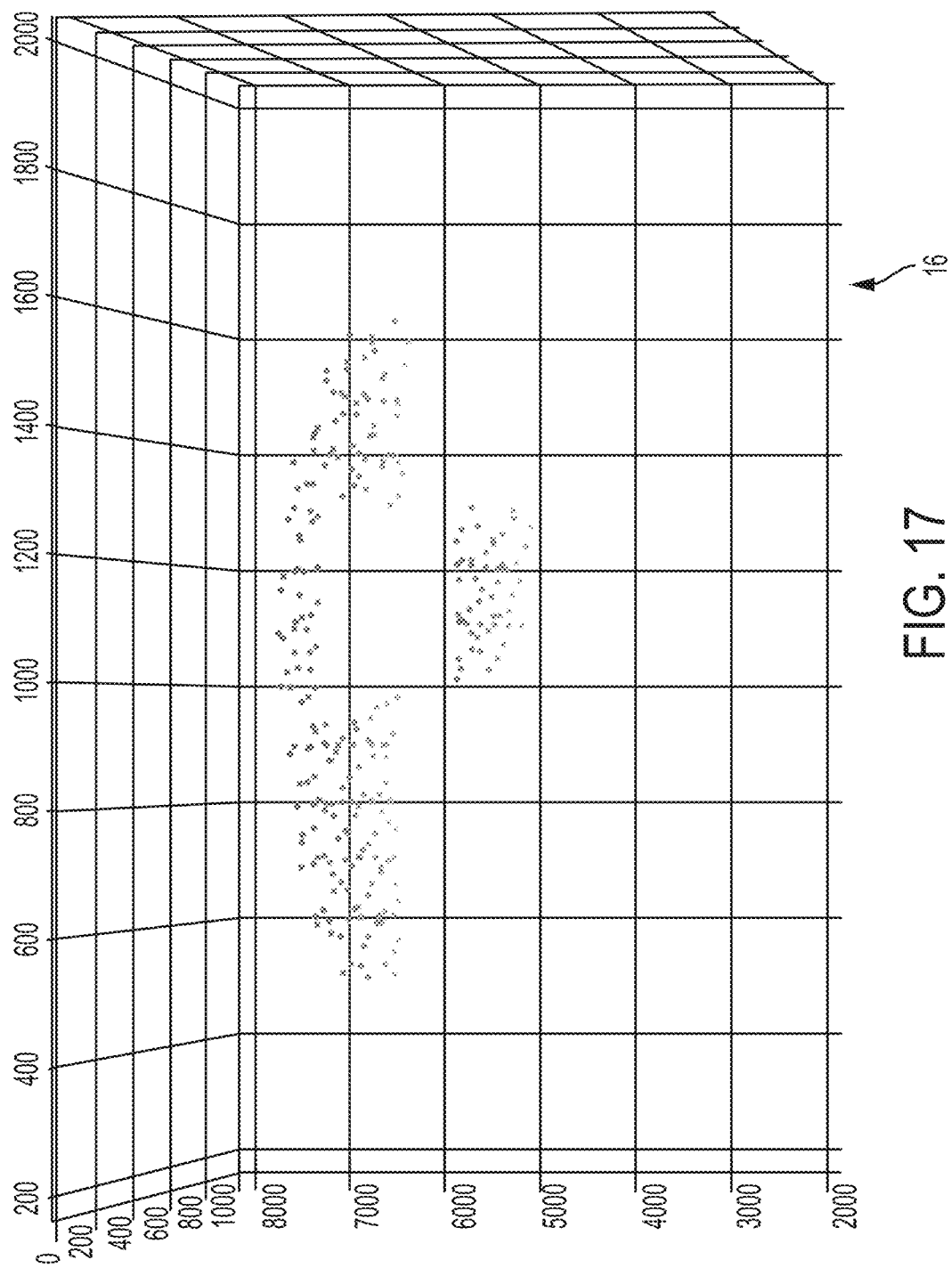
FIG. 17 illustrates a 3D model of the physical object in the physical environment captured in FIG. 12, generated according to the example working model of the embodiment of FIG. 12.

Hence, the processor circuit 42 of the 3D processor device 14 can calculate the 3D coordinate dot for each of the matching dot pairs 70, resulting in a collection (i.e., "cloud") of 3D coordinate dots that result in the 3D model 16 illustrated in FIG. 17. The 3D model 16 can be stored in the memory circuit 44 as a data structure comprising the 3D coordinate position for each 3D coordinate dot in the 3D model 16. As illustrated in FIG. 16, the 3D model 16 can be generated based on a subset of selected coordinate dots 74 (illustrated as squares surrounding selected coordinate dots) of all the laser dots that were detected and received from the respective camera devices 20; hence, the 3D model 16 can be generated without utilizing all the laser dots in the pattern of laser dots 32.

The processor circuit 42 of the 3D processor device 14 can send the 3D model 16 to the interactive controller device 22 of FIG. 1 in operation 76 for physical interaction of the 3D computer vision system 10 with the physical environment 30. For example, the processor circuit 42 of the 3D processor device 14 can cause the device interface circuit 40 in operation 76 to transmit (via a data link 34) the data structure containing the 3D coordinate positions for each 3D coordinate dot in the 3D model 16 (stored in the memory circuit 44) to the interactive controller 22, causing the VR user interface device 24 and/or the robotic controller device 26 to interact with the physical environment 30.

Figure 9A:
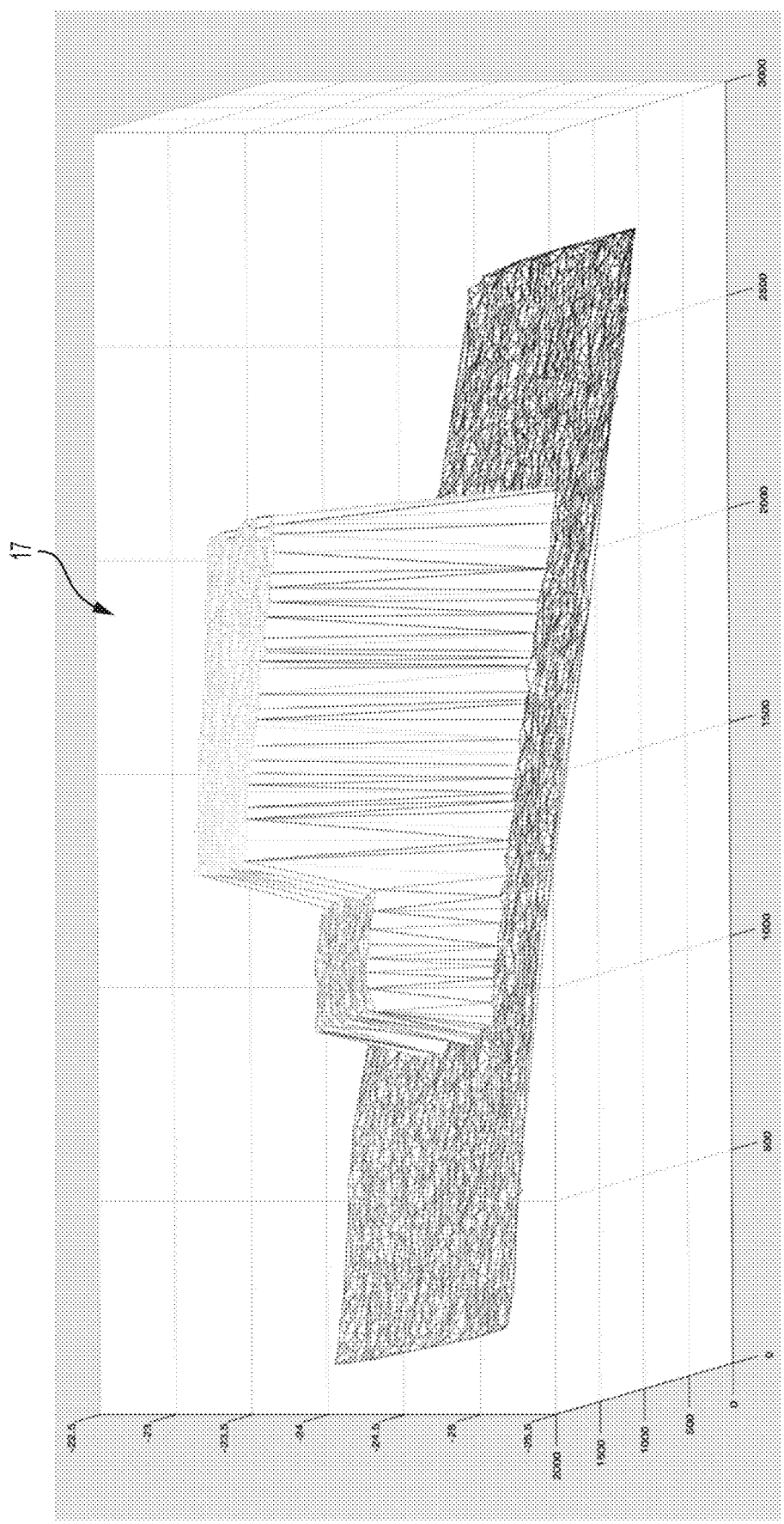
FIGS. 9A and 9B illustrate an example three-dimensional (3D) computer image generated from a physical object by the system of FIG. 1, according to an example embodiment.
Figure 9B:
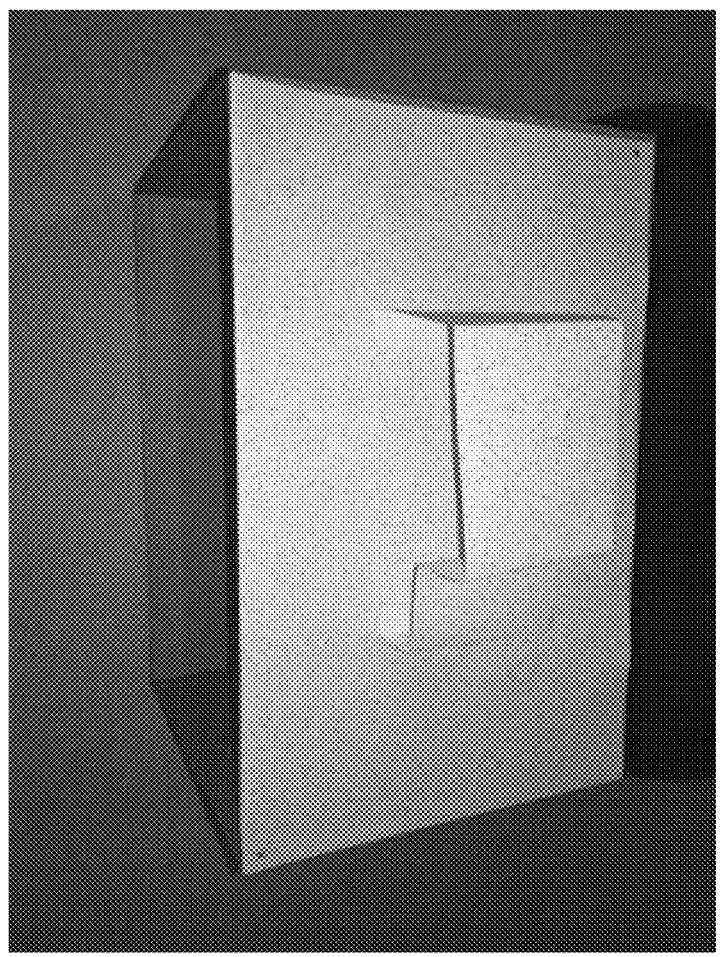

The processor circuit 42 of the 3D processor device 14 (and/or the processor circuit 42 of the interactive controller device 22) also can generate a 3D image (e.g., 17 of FIG. 9A) from the 3D model 16 based on executing 3D Delaunay triangulation on the 3D points in order to generate contours of the 3D model 16 (e.g., operation "17" of FIG. 4). The processor circuit 42 of the 3D processor device 14 and/or the interactive controller device 22 also can generate the 3D image 17 based on extracting, for each 3D triangle in the 3D model 16, image information from the corresponding triangle 66 in the pattern of laser dots 32 (e.g., color data) and apply the image information (e.g., color data") to render or "paint/decorate" the corresponding 3D triangle of the 3D model 16; additional color smoothing may be applied between adjacent 3D triangles of the 3D model 16 to generate the 3D image 17 having visually-accurate brightness, colors and textures relative to the physical objects 18 in the physical environment 30 (e.g., operation "18" of FIG. 4). As illustrated in FIG. 9A, the processor circuit 42 of the 3D processor device 14 can generate the 3D image 17 from the physical object 18 illustrated in FIG. 9B. FIG. 9B illustrates an image of a physical object 18 captured by one of the camera devices 20, which as described above results in the 3D image 17 of FIG. 9A (the 3D image 17 of FIG. 9A is illustrated as rotated along the X-axis, relative to the physical object 18 of FIG. 9B, to better illustrate the differences in "distance" along the Z-axis).

Hence, the processor circuit 42 of the 3D processor device 14 and/or the interactive controller device 22 can output (76 of FIG. 3B, e.g., operation "19" of FIG. 4) the 3D image 17 for interactive execution by the VR user interface device 24, enabling a user of the VR user interface device 24 to interact with the 3D image 17, for example for virtualized navigation and/or control of a remotely-controlled apparatus (e.g., the robotic controller device 26, a remotely-controlled vehicle, a remotely-controlled robotic instrument such as a factory robot, an unmanned aerial vehicle (UAV), etc.). The processor circuit 42 of the 3D processor device 14 and/or the interactive controller device 22 also can output the 3D model 16 for automated intelligence (AI) based executable applications that respond to the 3D model 16 and/or the 3D image 17 by generating a physical command, for example a steering, braking, and/or acceleration operation by a self-driving vehicle or UAV, etc.

Additional features and variations by example embodiments can be executed to the above-described operations. Example variations include augmenting use of the randomized pattern of laser dots, for example due to bright ambient light that might interfere with the laser dots. In this variation, the same or different cameras can capture the Left and Right images at different wavelengths (e.g. visible light), and the processor circuit 42 of the 3D processor device 14 can process the Left and Right images using a corner detection algorithm such as Shi-Tomasi algorithm.

Example variations also can include the 3D processor device 14 determining in operation 78 a velocity of the physical object 18 in the physical environment 30 (and represented in the 3D model 16) based on determining a dot velocity using subsequent images from the camera devices 20*a* and 20*b* at a second time instance "t2". In particular, as described previously with respect to the time instance "t=t1", the processor circuit 42 of the 3D processor device 14 in operation 78*a* (comprising operations 50, 52, 54, and 56 for time instance "t=t2") can cause the camera devices 20*a* and 20*b* to capture the third and fourth images of the pattern of laser dots 32 in the physical environment 30, for example based on outputting a second sync command simultaneously to the camera devices 20*a* and 20*b* at a time instance "t=t2". The device interface circuit 40 of the 3D processor device 14 is configured for receiving the second image data (e.g., 46 of FIG. 5) comprising the third and fourth images comprising a second projected pseudo-randomized pattern of laser dots from the camera devices 20*a* and 20*b* that was captured at the time instance "t=t2", for example the image "L_t2" captured by the camera device 20*a*, and the image "R_t2" captured by the camera device 20*b*. The processor circuit 42 of the 3D processor device 14 in operation 78*b* (comprising operation 58 at time instance "t=t2") can identify the third and fourth mesh of triangles (64 of FIG. 6) from the 2D positions in the third and fourth images, respectively.

Figure 10:
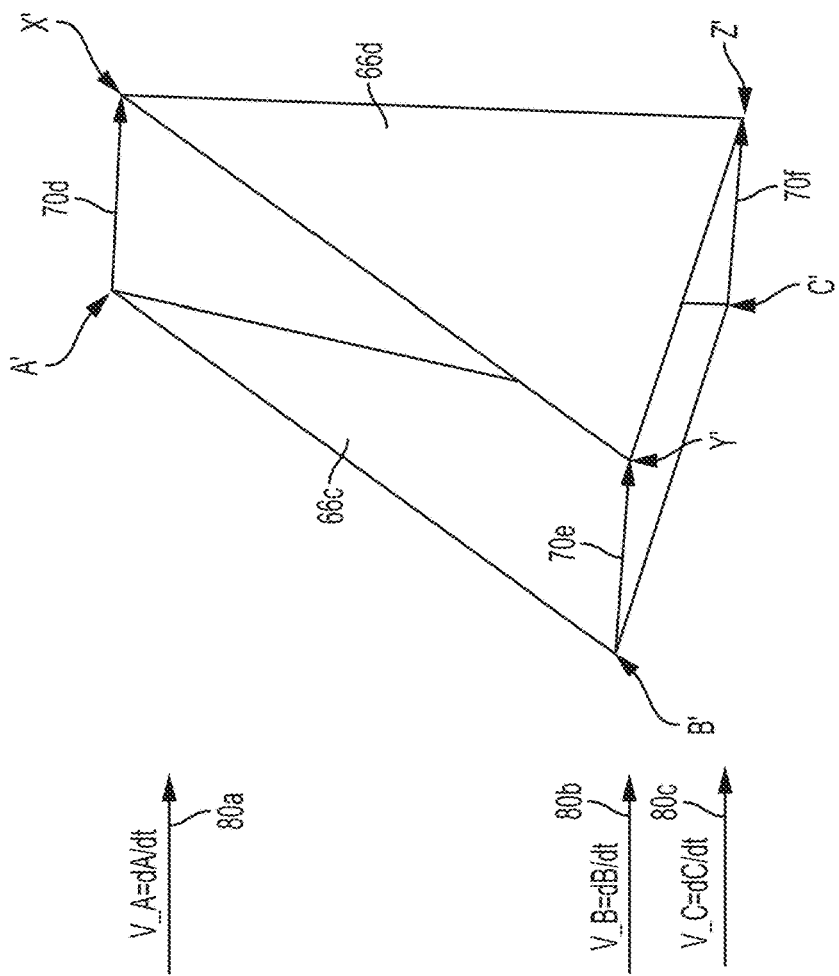
FIG. 10 illustrates an example triangular pattern matching used for calculation of a velocity in a 3D computer image, according to an example embodiment.
Figure 10:
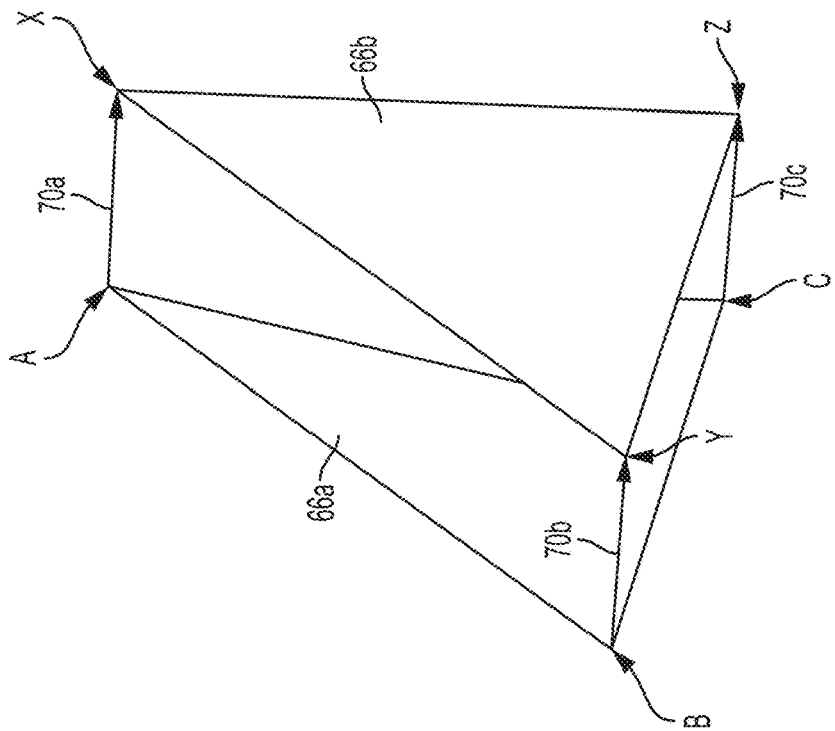

The processor circuit 42 of the 3D processor device 14 in operation 78*c* can identify matching triangles 66*a*, 66*b*, 66*c*, and 66*d* of FIG. 10 based on the identifying the laser dots having the minimal difference in geometric pattern shape, illustrated as the minimal relative Euclidean distance 70*d*, 70*e*, and 70*f* (corresponding to the matching dot pairs); hence, the matching dot pairs "A'-X'" ("A2") 70*d*, "B'-Y'" ("B2") 70*e*, and "C'-Z'" ("C2") 70*f* can be determined to have the minimal difference in geometric pattern shape based on the corresponding minimal Euclidean distance. The velocity vector (e.g., "V_A", "V_B", "V_C") 80 for each end of the matching triangles 66*a*, 66*b*, 66*c*, and 66*d* (i.e., "dot velocity") can be determined in operation 78*c* based on executing a time-based derivative operation "di" (relative to the difference in time "dt=t2−t1") on the matching dot pairs "A-X" ("A1") 70*a*, "B-Y" ("B1") 70*b*, and "C-Z" ("C1") 70*c*, in other words "V_A=dA/dt" 80*a*, "V_B=dB/dt" 80*b*, and "V_C=dC/dt" 80*c*, where the value "V_A=A2−A1", "V_B=B2−B1", and "V_C=C2−C1".

Hence the dot velocity 80 for each dot at an end of a matching triangle can be determined based on the 3D coordinates of two or more instances of images, where the dot velocities of the ends of matching triangles establish the corresponding velocity of the matching triangle (66*a* through 66*d*) in the 3D model 16.

Figure 11:
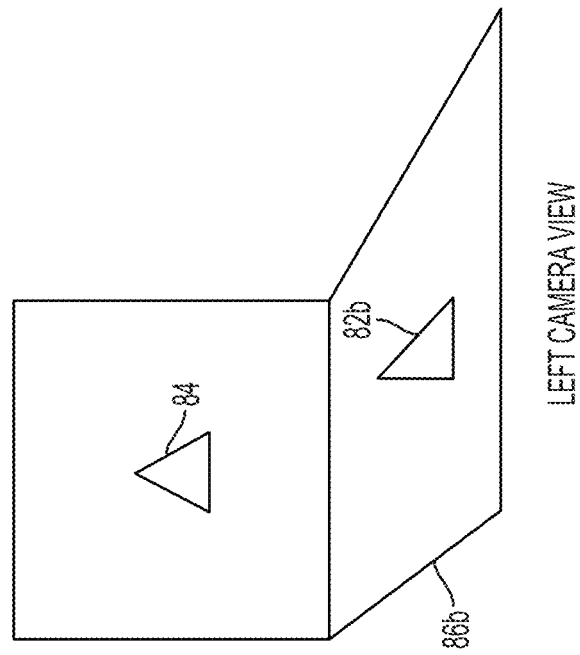
FIG. 11 illustrates example distortion due to non-perpendicular surfaces that is corrected according to an example embodiment.
Figure 11:
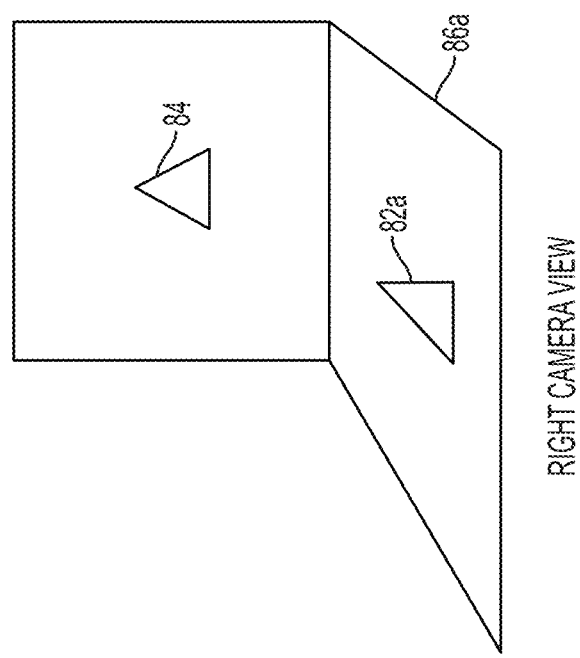

FIG. 11 illustrates an example of "shearing" 82*a*, 82*b* of a triangular-shaped object in the physical environment 30. In contrast to the triangular object 84 facing the surfaces of the camera lenses 20*a* and 20*b*, instances may arise where surfaces of an object 82 are not facing the plane of the camera lenses of the cameras 20*a* and 20*b*, e.g. a road surface 86 that runs horizontal (parallel) to the line of sight; in such instances, the shapes of the triangles may be distorted (shear) as sheared triangles 82*a*, 82*b* along the X coordinates, causing the triangles 82*a*, 82*b* on the left and right images to have different shapes that could create difficulties in pair-wise matching as illustrated above with respect to FIG. 8. Hence, various techniques can be used to match the sheared triangles 82*a*, 82*b*: for example, triangles 82*a* and 82*b* can be matched without using their respective X coordinates, for example based on using the vertices' "Y" coordinates and other characteristics for matching, for example the sizes of the vertex dots which are invariant between the left and right images; an alternative to matching triangles can include matching individual dots using their Y coordinates (after calibration to eliminate the Y offset between left and right images) and other characteristics such as dot sizes/shapes/moments. Dots can be differentiated based on utilizing dot projectors providing different distinct dot shapes, sizes, intensity, colors, etc.; individual dots also can be matched using their Y coordinates and the Y coordinates of their nearest neighbors; dot projectors can be used to project (horizontal) dot pairs with various pair length, enabling matching of dots using their pair length.

According to example embodiments, a low-cost system (e.g., around one hundred dollars ($100) or less) can construct the 3D model of the physical environment with an accuracy in depth of about one millimeter (1 mm) or less at a depth (i.e., in a Z axis) of two meters, while providing a detection range of hundreds of meters. The particular embodiments can cause a controllable device to interact with the physical environment, example controllable devices including self-driving vehicles (e.g., driverless vehicles, unmanned aerial vehicles, etc.), robotic-based devices or systems in a manufacturing facility, virtual reality based user interface devices, etc.

Moreover, the use of the randomized pattern of laser dots enables the particular embodiments to generate the 3D model of the physical environment without the substantial processing burdens normally encountered in image processing, such as feature extraction, pixel-by-pixel pattern matching, etc.

A working model of the example embodiment has been constructed and has successfully executed the operations described herein, illustrated in FIGS. 9A and 9B and described in further detail with respect to FIGS. 12-17.

Figure 12:
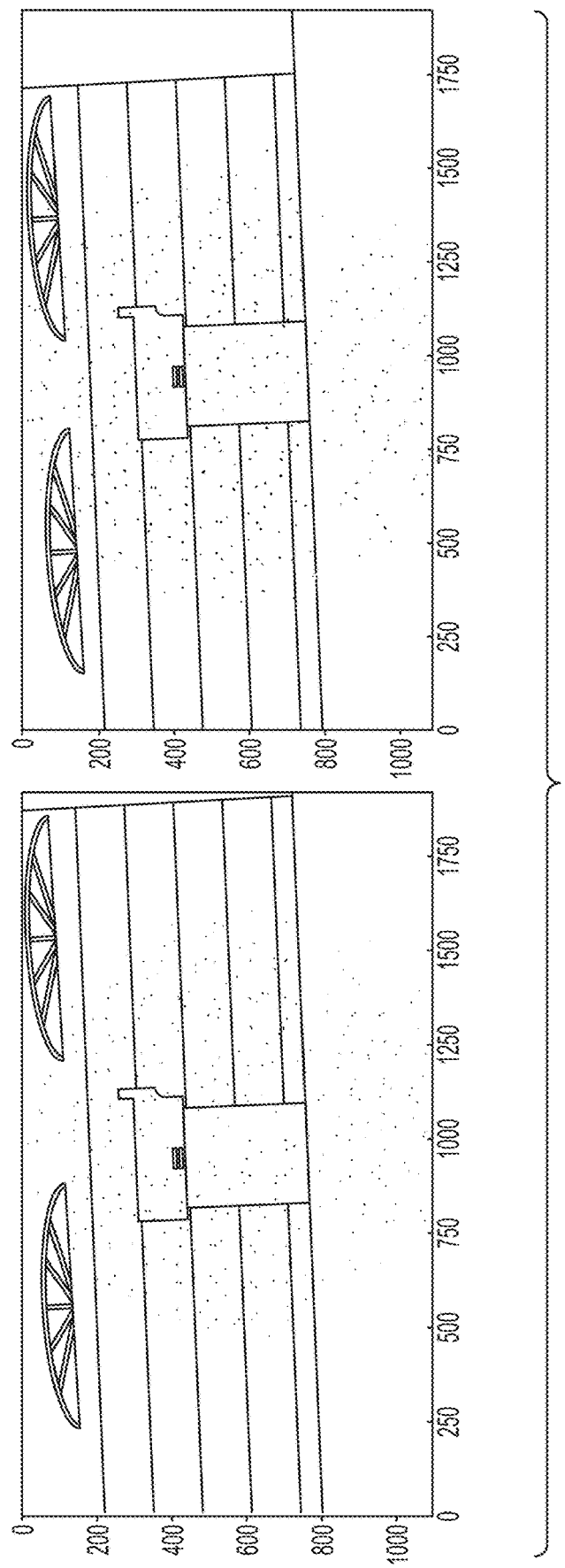
FIG. 12 illustrates an image of an example stereoscopic image pair of the projected pseudo-randomized pattern of laser dots detected by the camera devices of FIG. 1, according to an example working model of an embodiment.

FIG. 12 illustrates an image of an example stereoscopic image pair (illustrated as black/white and inverted) of the projected pseudo-randomized pattern of laser dots detected by the camera devices of FIG. 1, according to an example working model of an embodiment. The image of FIG. 12 corresponds to the corresponding image 46 of FIG. 5 illustrating the pattern of laser dots 32a and 32b: the image of FIG. 12 is a stereoscopic image (corresponding to 46 of FIG. 5) showing a recycling container positioned in front of a residential garage door and illuminated by a pattern of laser dots (32 of FIG. 5).

Figure 13:
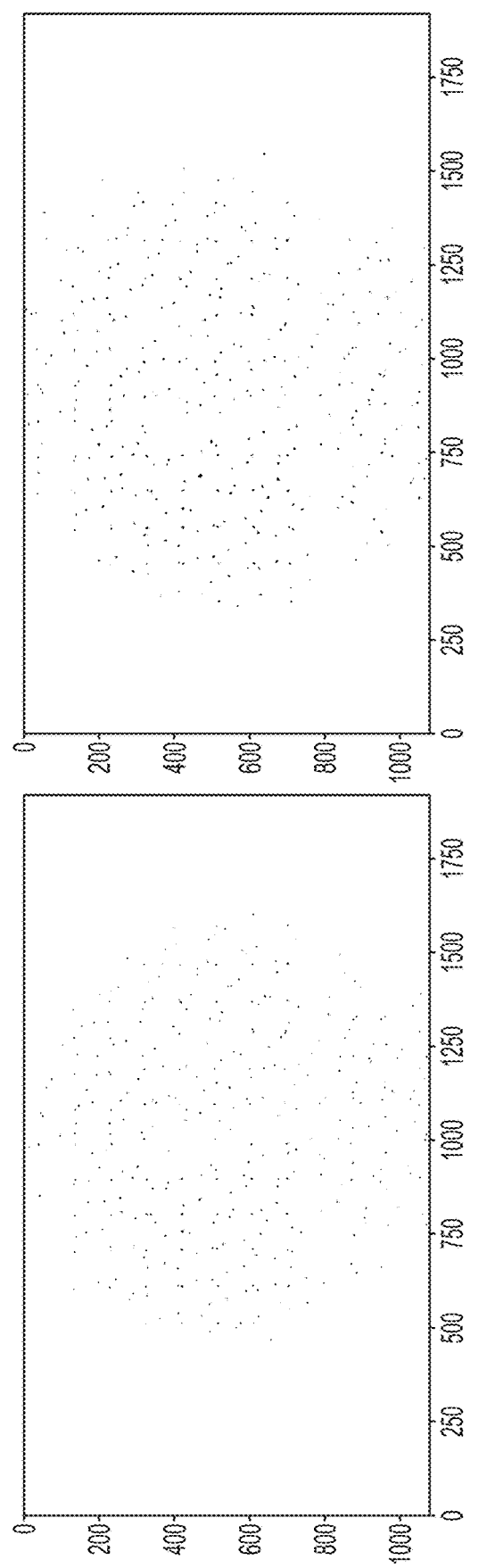
FIG. 13 illustrates an image of an example stereoscopic image pair of the projected pseudo-randomized pattern of laser dots of FIG. 12, according to the example working model of the embodiment of FIG. 12.

FIG. 13 illustrates an image of an example stereoscopic image pair (illustrated as black/white and inverted) of the projected pseudo-randomized pattern of laser dots of FIG. 12, following extraction (based on applying a threshold on the brightness of the gray sale image) and 2D position processing as executed in operation 56 of FIG. 3A, according to the example working model of the embodiment of FIG. 12. As illustrated in FIG. 13, the 2D dots can be positioned within an X-Y coordinate axis of 0-1750 (X-axis left-to-right) and 0-1250 (Y-axis top-to-bottom).

Figure 14:
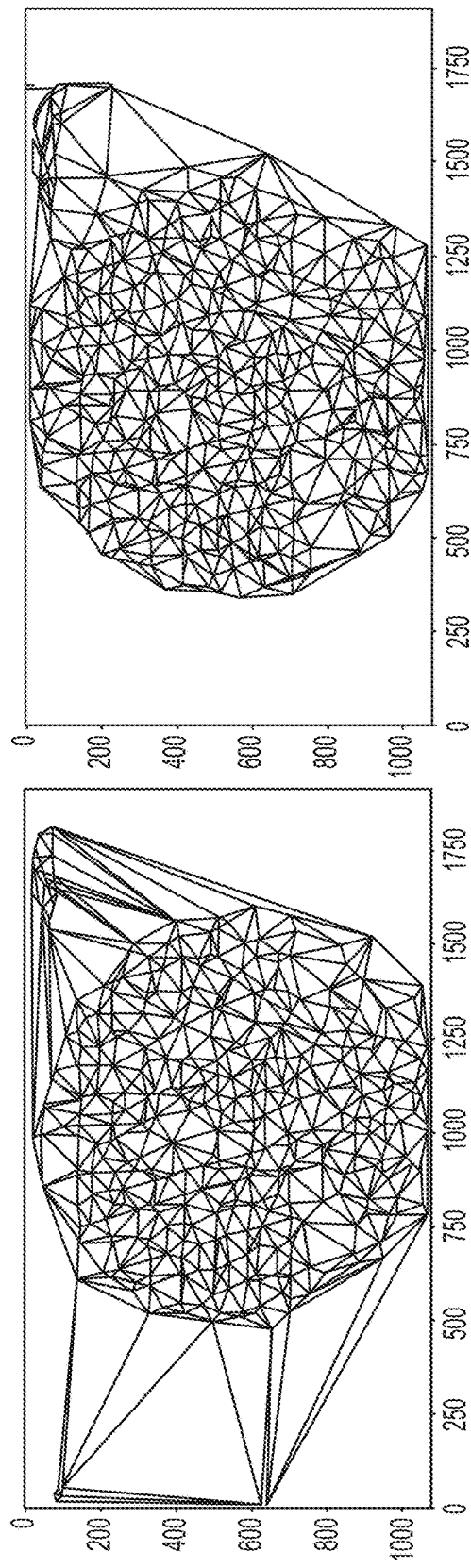
FIG. 14 illustrates an image of an example stereoscopic two-dimensional (2D) triangle object pair, generated by the apparatus of FIG. 1 for triangular pattern matching, according to the example working model of the embodiment of FIG. 12.

FIG. 14 illustrates an image of an example stereoscopic two-dimensional (2D) triangle object pair, generated by the apparatus of FIG. 1 for triangular pattern matching, according to the example working model of the embodiment of FIG. 12. The image of FIG. 14 corresponds to the stereoscopic 2D triangle object pair 62 of FIG. 7 comprising the 2D triangular object models 68a and 68b generated in operation 60 of FIG. 3A.

Figure 15:
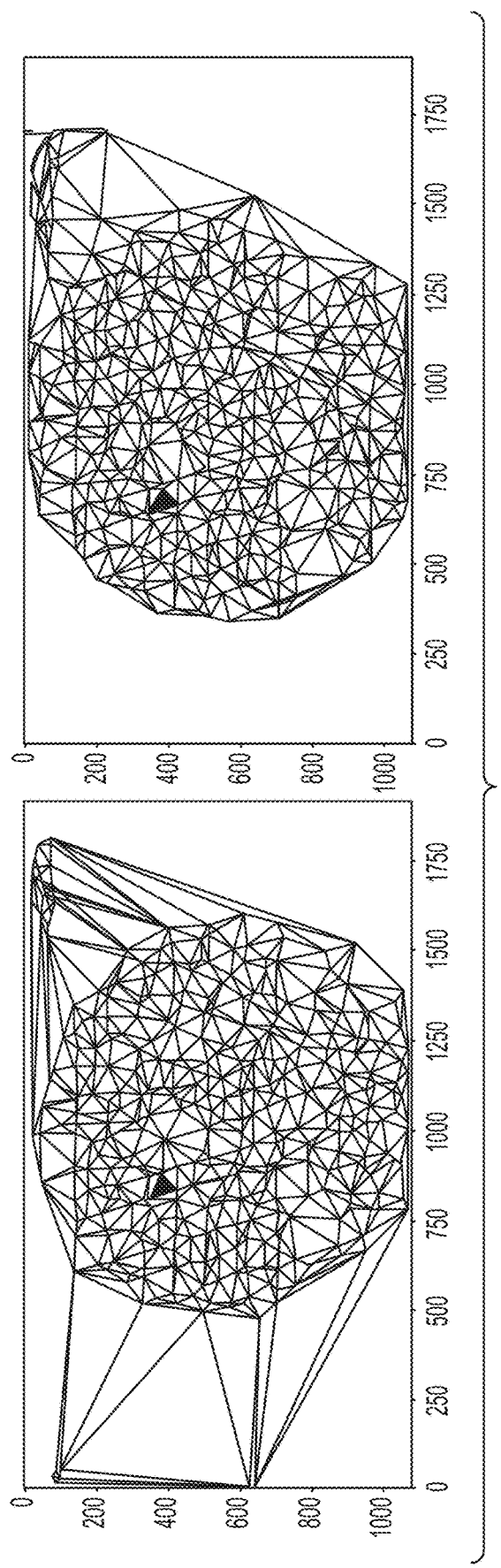
FIG. 15 illustrates an image of an example triangular pattern matching of the stereoscopic two-dimensional (2D) triangle object pair of FIG. 14, according to the example working model of the embodiment of FIG. 12.

FIG. 15 illustrates an image of an example triangular pattern matching of the stereoscopic two-dimensional (2D) triangle object pair of FIG. 14, according to the example working model of the embodiment of FIG. 12. The image of FIG. 15 illustrates the matching triangles 66a, 66b of FIG. 8 as a shaded (dark) triangle in each of the 2D triangular object models 68.

FIG. 16 illustrates an image of matching laser dots used to generate a 3D model of the physical object in the physical environment capture in FIG. 12, according to the example working model of the embodiment of FIG. 12. FIG. 16 illustrates the subset of selected coordinate dots 74 that are used to generate the 3D model 16, where other dots (e.g., in the lower portion of the images) are excluded because they are illuminated on the ground surface (corresponding to 86a, 86b of FIG. 11).

FIG. 17 illustrates a 3D model of the physical object in the physical environment captured in FIG. 12, generated according to the example working model of the embodiment of FIG. 12. As illustrated in FIG. 17, the 3D model 16 includes for each laser dot a corresponding 3D coordinate that is normalized using stereoscopic triangulation. As illustrated in FIG. 17, the distance to the closest object is 4.76 meters.

Although the example embodiments illustrate generation of the stereoscopic 2D triangle object pair 62 in generating the 3D model 16, other geometric patterns may be generated based on executing other geometric pattern matching instead of (or in combination with) triangle matching, enabling the generation of the 3D model based on stereoscopic triangulation of other geometric objects instead of (or in combination with) triangles.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
obtaining, by a computing device, first and second images each comprising a projected pattern of laser dots projected onto a physical object in a physical environment, the first and second images detected by respective camera devices;
generating, by the computing device from the first and second images, a stereoscopic two-dimensional (2D) object pair, comprising determining 2D positions for each of the laser dots detected in the first and second images, creating a first mesh of geometric patterns from the 2D positions in the first image, creating a second mesh of the geometric patterns from the 2D positions in the second image, and creating the stereoscopic 2D object pair based on matching geometric patterns from the first and second meshes of the geometric patterns; and
causing, by the computing device, a second device to interact with the physical environment based on the computing device generating a three-dimensional (3D) model of the physical object in the physical environment, the 3D model comprising 3D positions for the laser dots detected in the physical environment, based on the computing device executing stereoscopic triangulation of the stereoscopic 2D object pair.

2. The method of claim 1, wherein the creating of the first and second mesh of the geometric patterns comprises executing Delaunay triangulation on the 2D positions of the respective first and second images to generate the respective first and second mesh of the geometric patterns as respective first and second meshes of non-overlapping triangles.

3. The method of claim 1, wherein the generation of the stereoscopic 2D object pair is based on creating the first and second mesh of geometric patterns as respective first and second meshes of non-overlapping triangles, and matching corresponding triangles from the first and second meshes of the non-overlapping triangles.

4. The method of claim 1, wherein the first and second images each comprise the projected pattern of laser dots detected at a first time instance, the method further comprising determining a velocity of an object in the 3D model based on:
receiving third and fourth images comprising a second projected pattern of laser dots detected by the respective camera devices at a second time instance;
creating a third mesh of geometric patterns from 2D positions in the third image and a fourth mesh of the geometric patterns from the 2D positions in the fourth image, and identifying a matching geometric pattern among the first, second, third, and fourth mesh of the geometric patterns and associated with the object; and determining a dot velocity for each end of the matching geometric pattern based on the respective 2D positions of the matching geometric pattern among the first, second, third, and fourth mesh of the geometric patterns, the dot velocities for the ends of the matching geometric pattern establishing the corresponding velocity of the matching geometric pattern in the object in the 3D model.

5. The method of claim 1, further comprising causing one or more lasers to cause projection of the pattern of laser dots as a pseudo-randomized pattern of infrared laser dots.

6. The method of claim 1, wherein the matching of geometric patterns from the first and second meshes of the triangles comprises:

matching a first group of the geometric patterns based on pair-wise matching of matching geometric patterns having minimal difference in geometric pattern shape;

identifying non-matching geometric patterns from the first and second images, and from the non-matching geometric patterns matching a second group of the geometric patterns based on Y-coordinate matching and matching at least a second characteristic of laser dots.

7. The method of claim 1, wherein the obtaining comprises generating each of the first and second images of the projected pattern based on combining different respective grid-based projections of the laser dots.

8. An apparatus implemented as a physical machine, the apparatus comprising:

non-transitory machine readable media configured for storing executable machine readable code;

a device interface circuit configured for receiving image data from camera devices; and a processor circuit configured for executing the machine readable code, and when executing the machine readable code operable for:

obtaining first and second images each comprising a projected pattern of laser dots projected onto a physical object in a physical environment, the first and second images detected by the respective camera devices, generating, from the first and second images, a stereoscopic two-dimensional (2D) object pair, comprising determining 2D positions for each of the laser dots detected in the first and second images, creating a first mesh of geometric patterns from the 2D positions in the first image, creating a second mesh of the geometric patterns from the 2D positions in the second image, and creating the stereoscopic 2D object pair based on matching geometric patterns from the first and second meshes of the geometric patterns, and causing a second device to interact with the physical environment based on generating a three-dimensional (3D) model of the physical object in the physical environment, the 3D model comprising 3D positions for the laser dots detected in the physical environment, based on the processor circuit executing stereoscopic triangulation of the stereoscopic 2D.

9. The apparatus of claim 8, wherein the processor circuit is configured for creating the first and second mesh of the geometric patterns based on executing Delaunay triangulation on the 2D positions of the respective first and second images to generate the respective first and second mesh of the geometric patterns as respective first and second meshes of non-overlapping triangles.

10. The apparatus of claim 8, wherein the generation of the stereoscopic 2D object pair is based on creating the first and second mesh of geometric patterns as respective first and second meshes of non-overlapping triangles, and matching corresponding triangles from the first and second meshes of the non-overlapping triangles.

11. The apparatus of claim 8, wherein the first and second images each comprise the projected pattern of laser dots detected at a first time instance, the processor circuit further configured for determining a velocity of an object in the 3D model based on:

receiving third and fourth images comprising a second projected pattern of laser dots detected by the respective camera devices at a second time instance;

creating a third mesh of geometric patterns from 2D positions in the third image and a fourth mesh of the geometric patterns from the 2D positions in the fourth image, and identifying a matching geometric pattern among the first, second, third, and fourth mesh of the geometric patterns and associated with the object; and determining a dot velocity for each end of the matching geometric pattern based on the respective 2D positions of the matching geometric pattern among the first, second, third, and fourth mesh of the geometric patterns, the dot velocities for the ends of the matching geometric pattern establishing the corresponding velocity of the matching geometric pattern in the object in the 3D model.

12. The apparatus of claim 8, wherein the processor circuit is configured for causing one or more lasers to cause projection of the pattern of laser dots as a pseudo-randomized pattern of infrared laser dots.

13. The apparatus of claim 8, wherein the processor circuit is configured for matching geometric patterns from the first and second meshes of the triangles based on:

matching a first group of the geometric patterns based on pair-wise matching of matching geometric patterns having minimal difference in geometric pattern shape; and identifying non-matching geometric patterns from the first and second images, and from the non-matching geometric patterns matching a second group of the geometric patterns based on Y-coordinate matching and matching at least a second characteristic of laser dots.

14. The apparatus of claim 8, wherein the processor is configured for obtaining each of the first and second images of the projected pattern based on combining different respective grid-based projections of the laser dots.

15. One or more non-transitory tangible media encoded with logic for execution by a machine and when executed by the machine operable for:

obtaining, by the machine implemented as a computing device, first and second images each comprising a projected pattern of laser dots projected onto a physical object in a physical environment, the first and second images detected by respective camera devices;

generating, by the computing device from the first and second images, a stereoscopic two-dimensional (2D) object pair, comprising determining 2D positions for each of the laser dots detected in the first and second images, creating a first mesh of geometric patterns from the 2D positions in the first image, creating a second mesh of the geometric patterns from the 2D positions in the second image, and creating the stereoscopic 2D object pair based on matching geometric patterns from the first and second meshes of the geometric patterns; and causing, by the computing device, a second device to interact with the physical environment based on the computing device generating a three-dimensional (3D) model of the physical environment, the 3D model comprising 3D positions for the laser dots detected in the physical environment, based on the computing device executing stereoscopic triangulation of the stereoscopic 2D object pair.

16. The one or more non-transitory tangible media of claim 15, wherein the creating of the first and second mesh of the geometric patterns comprises executing Delaunay triangulation on the 2D positions of the respective first and second images to generate the respective first and second mesh of the geometric patterns as respective first and second meshes of non-overlapping triangles.

17. The one or more non-transitory tangible media of claim 15, wherein the generation of the stereoscopic 2D object pair is based on creating the first and second meshes of geometric patterns as respective first and second mesh of non-overlapping triangles, and matching corresponding triangles from the first and second meshes of the non-overlapping triangles.

18. The one or more non-transitory tangible media of claim 15, wherein the first and second images each comprise the projected pattern of laser dots detected at a first time instance, the method further comprising determining a velocity of an object in the 3D model based on:

receiving third and fourth images comprising a second projected pattern of laser dots detected by the respective camera devices at a second time instance;

creating a third mesh of geometric patterns from 2D positions in the third image and a fourth mesh of the geometric patterns from the 2D positions in the fourth image, and identifying a matching geometric pattern among the first, second, third, and fourth mesh of the geometric patterns and associated with the object; and determining a dot velocity for each end of the matching geometric pattern based on the respective 2D positions of the matching geometric pattern among the first, second, third, and fourth mesh of the geometric patterns, the dot velocities for the ends of the matching geometric patterns establishing the corresponding velocity of the matching geometric patterns in the object in the 3D model.

19. The one or more non-transitory tangible media of claim 15, further operable for causing one or more lasers to cause projection of the pattern of laser dots as a pseudo-randomized pattern of infrared laser dots.

20. The one or more non-transitory tangible media of claim 15, wherein the matching of geometric patterns from the first and second meshes of the geometric patterns comprises:

matching a first group of the geometric patterns based on pair-wise matching of matching geometric patterns having minimal difference in geometric pattern shape;

identifying non-matching geometric patterns from the first and second images, and from the non-matching geometric patterns matching a second group of the geometric patterns based on Y-coordinate matching and matching at least a second characteristic of laser dots.

* * * * *

UNITED STATES PATENT AND TRADEMARK OFFICE
CERTIFICATE OF CORRECTION

PATENT NO. : 10,753,736 B2
APPLICATION NO. : 16/045898
DATED : August 25, 2020
INVENTOR(S) : Nguyen et al.

Page 1 of 1

It is certified that error appears in the above-identified patent and that said Letters Patent is hereby corrected as shown below:

Column 15, Claim 8, Line 60, delete "2D." and insert --2D object pair.-- therefor Signed and Sealed this
Twenty-ninth Day of September, 2020

Andrei Iancu
*Director of the United States Patent and Trademark Office*